US012443202B1

(12) United States Patent
Walsh

(10) Patent No.: US 12,443,202 B1
(45) Date of Patent: Oct. 14, 2025

(54) PORTABLE GROUND CONTROL STATION

(71) Applicant: Parry Labs, LLC, Alexandria, VA (US)

(72) Inventor: David Walsh, Alexandria, VA (US)

(73) Assignee: Parry Labs, LLC, Alexandria, VA (US)

( * ) Notice: Subject to any disclaimer, the term of this patent is extended or adjusted under 35 U.S.C. 154(b) by 0 days.

(21) Appl. No.: 18/969,485

(22) Filed: Dec. 5, 2024

(51) Int. Cl.
*G05D 1/226* (2024.01)
*G05D 1/229* (2024.01)
*G05D 109/20* (2024.01)

(52) U.S. Cl.
CPC ............. *G05D 1/226* (2024.01); *G05D 1/229* (2024.01); *G05D 2109/20* (2024.01)

(58) Field of Classification Search
CPC ..... G05D 1/226; G05D 1/229; G05D 2109/20
See application file for complete search history.

(56) References Cited

U.S. PATENT DOCUMENTS

| | | | | |
|---|---|---|---|---|
| 9,979,463 | B1 * | 5/2018 | Shafer | H04B 7/18504 |
| 10,452,064 | B1 * | 10/2019 | Ray | G05D 1/0016 |
| 2018/0139074 | A1 * | 5/2018 | Hong | H04B 7/185 |
| 2021/0058267 | A1 * | 2/2021 | Prest | H04L 12/40 |

FOREIGN PATENT DOCUMENTS

KR 101200913 B1 * 11/2012 ............ G06F 17/10

* cited by examiner

*Primary Examiner* — Michael J Zanelli
(74) *Attorney, Agent, or Firm* — Caldwell Intellectual Property Law

(57) ABSTRACT

A portable ground control station, the portable ground control station including a graphical processing unit, general-purpose processor, a radiofrequency (RF) control channel device configured to control an unmanned arial vehicle (UAV), one or more display interface outputs communicatively connected to a plurality of displays, a first memory partition communicatively connected to at least a first core of the first plurality of cores and the second plurality of cores, the memory containing instructions configuring the at least a first core to generate a first operating environment on the at least a first core, select an RF control channel of the plurality of RF control channels, transmit, using a software module operating in the first operating environment, at least a flight command to the UAV using the selected RF control channel, receive transmission data from the UAV and output the transmission data on a display of the plurality of displays.

20 Claims, 9 Drawing Sheets

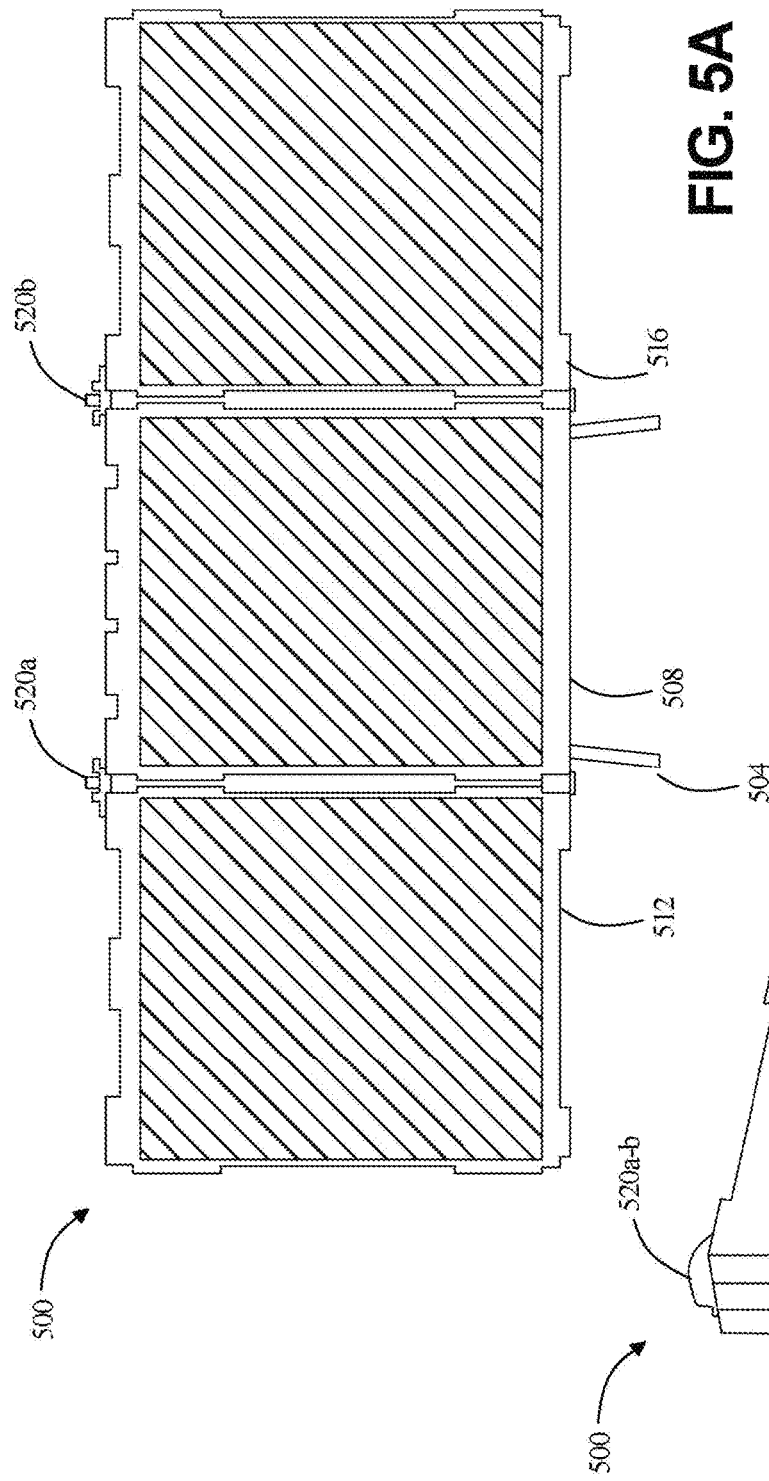
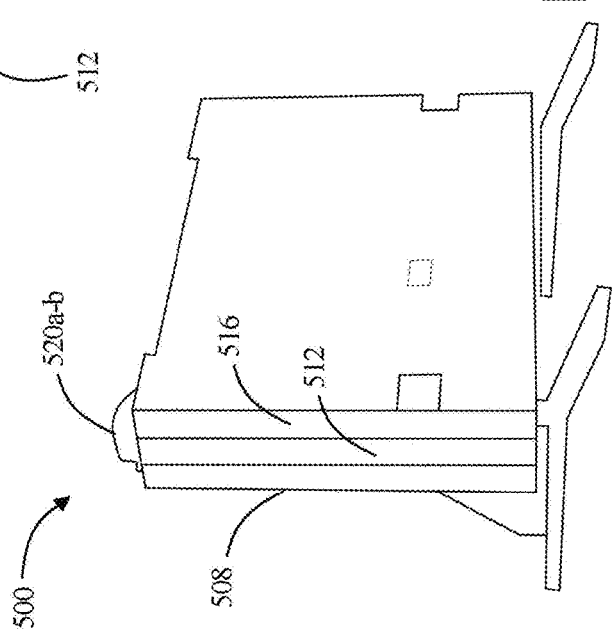

PORTABLE GROUND CONTROL STATION

FIELD OF THE INVENTION

The present invention generally relates to the field of unmanned aerial vehicles. In particular, the present invention is directed to portable ground control stations.

BACKGROUND

Unmanned aerial vehicles (UAV) need to be controlled by users, and while they can be controlled from a great distance, some proximity to the UAV in question is often desirable. However, it can be difficult to bring sufficient computing power to a location where it is needed, and control of multiple UAVs can suffer because of the bulk of the machinery needed to control them. Furthermore, it remains a challenge to protect the full stack of UAV control systems from exploits or insufficiently secured software.

SUMMARY OF THE DISCLOSURE

In an aspect, a portable ground control station is described. The portable ground control station includes a graphical processing unit, the graphical processing unit including a first plurality of processor cores, a general-purpose processor, the general-purpose processor including a second plurality of processor cores, a radiofrequency (RF) control channel device including a plurality of radiofrequency (RF) control channels, wherein each radio frequency control channel is configured to control an unmanned aerial vehicle (UAV), one or more display interface outputs communicatively connected to a plurality of displays and a binary unit system connecting the graphical processing unit to the general-purpose process. The portable ground control station further includes a first memory partition communicatively connected to at least a first core of the first plurality of cores and the second plurality of cores, the memory containing instructions configuring the at least a first core to generate a first operating environment on the at least a first core, select an RF control channel of the plurality of RF control channels, transmit, using a software module operating in the first operating environment, at least a flight command to the UAV using the selected RF control channel, receive transmission data from the UAV and output the transmission data on a display of the plurality of displays.

In another aspect, a portable ground control station is described. The portable ground control station includes a graphical processing unit, the graphical processing unit including a first plurality of processor cores, a general-purpose processor, the general-purpose processor including a second plurality of processor cores, a radiofrequency (RF) control channel device including a plurality of radiofrequency (RF) control channels, wherein each radio frequency control channel is configured to control an unmanned aerial vehicle (UAV), one or more display interface outputs communicatively connected to a plurality of displays and a binary unit system connecting the graphical processing unit to the general-purpose process. The portable ground control station further includes a first memory partition communicatively connected to at least a first core of the first plurality of cores and the second plurality of cores, the memory containing instructions configuring the at least a first core to generate a first operating environment on the at least a first core, select an RF control channel of the plurality of RF control channels, transmit, using a software module operating in the first operating environment, at least a flight command to the UAV using the selected RF control channel, receive transmission data from the UAV, convert the transmission data from a first data protocol to a second data protocol and communicate the transmission data to a terrestrial device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 5A is an illustration of an exemplary embodiment of a deployed display kit;

FIG. 5B is an illustration of an exemplary embodiment of a collapsed display kit;

Figure 1:
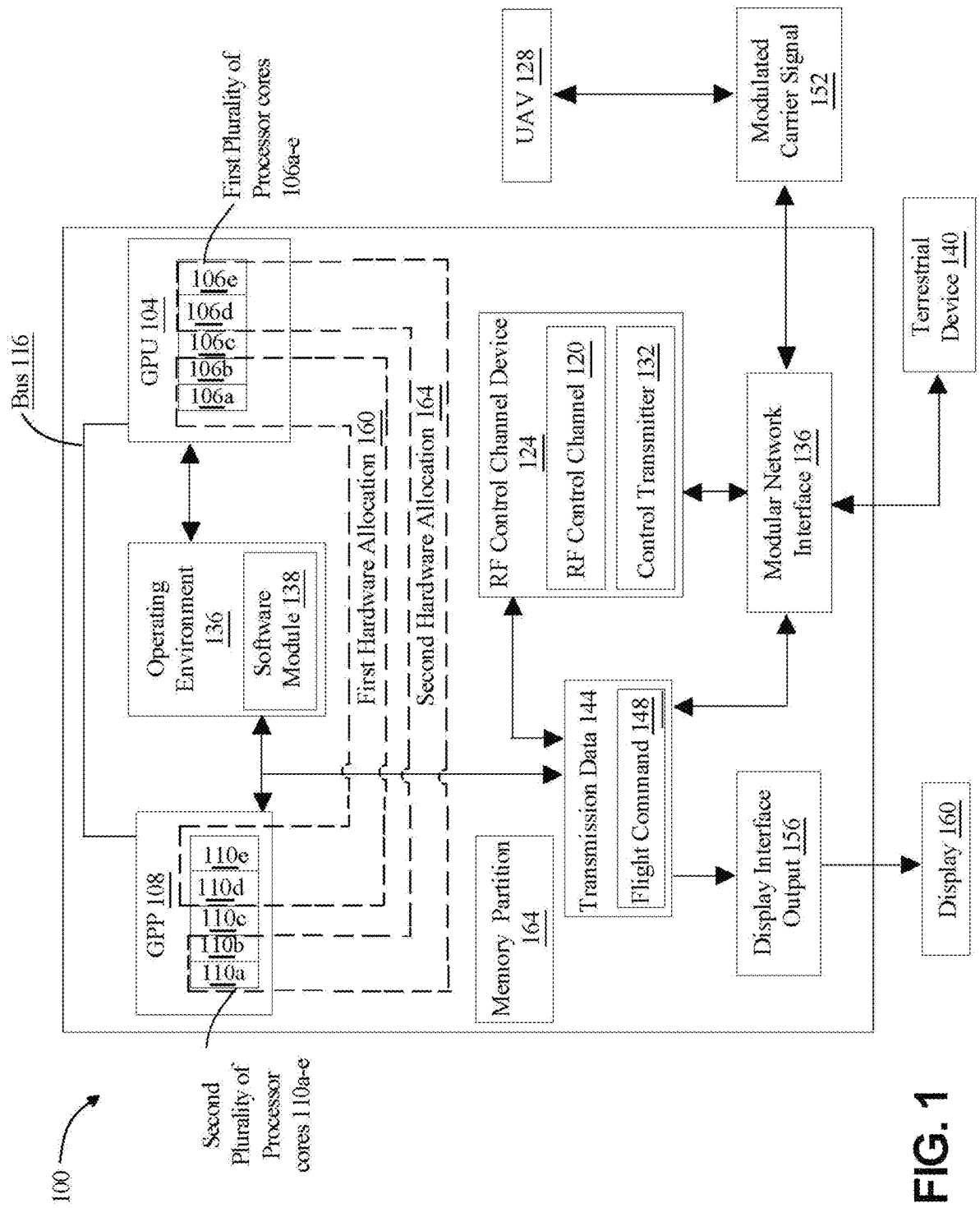
FIG. 1 is a block diagram of a portable ground control station.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for portable ground control stations. In an embodiment, a portable ground control station may include a graphical processing unit, the graphical processing unit including a first plurality of processor cores, a general-purpose processor, the general-purpose processor including a second plurality of processor cores, a radio frequency (RF) control channel device including a plurality of radio frequency (RF) control channels, wherein each radio frequency control channel is configured to control an unmanned aerial vehicle (UAV), one or more display interface outputs communicatively connected to a plurality of displays and a binary unit system connecting the graphical processing unit to the general-purpose process. In an embodiment, the portable ground control station may further include a memory partition containing instructions configuring a process core to transmit flight commands, receive transmission data and display the transmission data. In an embodiment, portable ground control station may be used as a node between an aerial device and a terrestrial device. In an embodiment, portable ground control station may allow for communications with multiple unmanned aerial vehicles.

Embodiments of the disclosed invention may provide an expeditionary multi-platform UAS control system, communications hub mission support solution, or the like for airworthy systems. In some embodiments, ground control station may containerize and/or integrate diverse vendor flight management systems (FMS) to enable control of multiple types of UAS as well as multi-vehicle control from a unified, simple interface structure. Embodiments may be used to host COTS/GOTS auto-routing solutions for single, multi-ship, and swarming UAS. In some embodiments, disclosed invention may set an open mission interface for UAS operators to create heterogenous drone swarms with synchronized actions, layered automation, and/or full mission autonomy. Embodiments may be provided in a variety of form factors for static or on the move deployments; embodiments may integrate with ATAK-enabled controllers and/or may be configured to operate as a node onboard a UAS. Embodiments disclosed herein, and/or systems incorporating such embodiments, may perform multiple command and control functions, including multivehicle and/or multi-type control and/or communication; embodiments described in this disclosure may communicate with, control, and/or otherwise use existing or new smart weapon systems and/or architectures. Embodiments described in this disclosure may perform and/or implement assured positioning, navigation, and timing (APNT) systems and/or platforms. Embodiments described in this disclosure may implement or support open architecture protocols such as without limitation MOSA, OMS, and/or FACE.

Referring now to FIG. 1, an exemplary embodiment of a portable ground control station 100 is illustrated. Portable ground control station 100 includes digital logic circuitry configured to perform operations disclosed herein as described in further detail below. Portable ground control station includes a graphical processing unit (GPU 104). GPU 104 includes a first plurality of processor cores. GPU 104 may include a type of computer chip often used for graphics related tasks such as 3D rendering. In one or more embodiments, GPU 104 may contain more, smaller, and more specialized cores than a typical general processor, allowing it to run larger sets of functions at once. In addition to 3D rendering, GPU 104 may also be used for other functions, such as those in which operations must be performed on large matrices of data. In one or more embodiments, GPU 104 may use a system on a module (SOM) design. An "SoM" design may include a module that contains at least a processor and other components, such as without limitation memory, storage connectors, and/or other components as described in this disclosure; such design may enable a SOM to function as either a complete or near-complete system. A GPU 104 SOM may be used to create an embeddable module that uses parallel computation. In a non-limiting embodiment, GPU 104 may include an NVIDIA JETSON NX, an NVIDIA Ampere or the like; for instance, GPU 104 may include a 2048-core NVIDIA Ampere with 64 Tensor Cores. GPU 104 may include a first plurality of processor cores, where each "processor core" is a unit within a processor that n receive operation codes and perform operations such as arithmetic, logic, memory retrieval, memory storage, and other operations; one core may be able to perform a first instruction while a second core is able to perform a second instruction simultaneously, or in other words within the same clock cycle, even without pipelining and/or multithreading. Each core may further use multithreading and/or pipelining to perform a plurality of instructions simultaneously. Portable ground control station 100 may include a plurality of GPU 104s and/or GPU 104 SoMs; for instance, in some embodiment, portable ground control station 100 may include two GPU 104 SoMs.

Still referring to FIG. 1, a processor such as GPU 104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; a processor may be organized according to Von Neumann and/or Harvard architecture as a non-limiting example. A processor may include, incorporate, and/or be incorporated in, without limitation, a microcontroller, microprocessor, digital signal processor (DSP), FPGA, Complex Programmable Logic Device (CPLD), GPU 104, CPU, Tensor Processing Unit (TPU), analog or mixed signal processor, Trusted Platform Module (TPM), a floating point unit (FPU), system on module (SOM), and/or system on a chip (SoC).

Still referring to FIG. 1, in one or more embodiments, GPU 104 may use a system on a module (SOM) design. In one or more embodiments, a SOM GPU 104 may include NVIDIA Jetson NX or Google Coral. In one or more embodiments, a GPU 104 may use a Chip Down Design.

Still referring to FIG. 1, in one or more embodiments, portable ground control station 100 may include a GPU 104 dedicated memory. A dedicated memory may be physically closer to GPU 104 and may be configured for fast and/or efficient access by GPU 104. In one or more embodiments, a dedicated memory for GPU 104 may include persistent memory. In one or more embodiments, a dedicated memory for GPU 104 may include temporary memory. In one or more embodiments, inclusion of a dedicated memory for GPU 104 may improve the efficiency of portable ground control station 100 in comparison to retrieval of information from a general-purpose memory. Optionally, a dedicated memory for GPU 104 may include 72-bit DDR4 memory. In one or more embodiments, GPU 104 dedicated memory may be accessible only by GPU 104. In one or more embodiments, GPU 104 dedicated memory may be accessible by GPU 104, and/or CPU/GPP.

Still referring to FIG. 1, portable ground control station 100 includes a general-purpose processor (GPP 108), the general-purpose processor comprising a second plurality of processor cores 110a-e. GPP 108 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; GPP 108 may be organized according to Von Neumann and/or Harvard architecture as a non-limiting example. In a non-limiting example, GPP 108 may include a Reduced Instruction Set Computer (RISC) processor. As used in this disclosure, "a reduced instruction set computer (RISC)" is a type of computing device, particularly a microprocessor that is designed to perform a smaller number (ranges from around 50 or less to a few hundred instructions or more) of (computer) instruction at a high speed (within one clock cycle). In some cases, RISC may include a processor using few dozens of simple instructions, which may be executed within a single clock cycle, as opposed to complex instruction set computers (CISC) that have instructions that may take a plurality of clock cycles to execute. In one or more embodiments, instructions may be classified as simple instructions when instructions only contain basic operations, such as, without limitation, arithmetic (e.g., add, subtract, multiply, divide, and/or the like), logical operations (e.g., and, or, not), data movement (import/export, upload, store, and/or the like), and any other desired operations that are designed to be performed quickly and efficiently. In some cases, instructions used by RISC processor may be fixed in length, for example, 32 bits. In some cases, memory access in RISC designs may be limited to load and store instructions such as any instructions as described herein. In some cases, however, operations executed by RISC may take more than one clock cycle, for example, execution time of one or more operations may depend on memory system's speed (but RISC may be configured to keep these operations as fast as possible). In a non-limiting example, memory may be accessed through LOAD i.e., to load a memory location and STORE i.e., to write to it, wherein all other instructions may operate on one or more processor registers and processor may not have direct access to manipulate memory. In some cases, RISC processor may include fewer addressing modes than CISC processor to simply hardware components required for decoding and/or executing instructions. In a non-limiting example, instructions may include one or more register-to-register (register-based) operation in which arithmetic and logical operations listed above are performed between registers, and if data is needed from memory, the data may be first loaded into at least one register. In some cases, RISC may be capable of pipeline processing, wherein simple and uniform instruction sets may enable optimal pipeline processing; for instance, subsets of instruction sets may be overlapped. Additionally, RISC may operate only on a smaller number of data types (e.g., integer, float, character, Booleans, pointers, and/or the like). RISC may be configured to perform instruction sets in parallel to increase the rate at which instructions are executed. Exemplary RISC may include, without limitation, ARM, MIPS, POWERPC, SPARC, and the like. For instance, and without limitation, GPP 108 may include an ARM processor such as a 12-core ARM® Cortex®-A78AE v8.2 64-bit GPP 108. GPP 108 may include, without limitation, a level 1 (L1) cache, level 2 (L2) cache, and/or level 3 (L3) cache; as a non-limiting example, an L2 cache may have 3 megabytes (MB) of capacity and an L3 cache may have 6 MB of capacity. GPP 108 may include one or more dedicated primary memory components and/or one or more dedicated storage components, for instance and without limitation as described in further detail below.

Still referring to FIG. 1, GPP 108 may include a Central Processing Unit (CPU). CPU may include a general-purpose computer processor. CPU may include a Reduced Instruction Set Computer (RISC) processor. In one or more embodiments, RISC processors may include less complicated functions than a Complex Instruction Set Computer (CISC). In one or more embodiments, this may allow individual instructions to be performed more quickly on a RISC processor than a CISC processor. As used in this disclosure, "a reduced instruction set computer (RISC)" is a type of computing device, particularly a microprocessor that is designed to perform a smaller number (ranges from around 50 or less to a few hundred instructions or more) of (computer) instruction at a high speed (within one clock cycle). In some cases, RISC may include a processor using few dozens of simple instructions, which may be executed within a single clock cycle, as opposed to complex instruction set computers (CISC) that have instructions that may take a plurality of clock cycles to execute. In one or more embodiments, instructions may be classified as simple instructions when instructions only contain basic operations, such as, without limitation, arithmetic (e.g., add, subtract, multiply, divide, and/or the like), logical operations (e.g., and, or, not), data movement (import/export, upload, store, and/or the like), and any other desired operations that are designed to be performed quickly and efficiently. In some cases, instructions used by RISC processor may be fixed in length, for example, 32 bits. In some cases, memory access in RISC designs may be limited to load and store instructions such as any instructions as described herein. In some cases, however, operations executed by RISC may take more than one clock cycle, for example, execution time of one or more operations may depend on memory system's speed (but RISC may be configured to keep these operations as fast as possible). In a non-limiting example, memory and/or may be accessed through LOAD i.e., to load a memory location and STORE i.e., to write to it, wherein all other instructions may operate on one or more processor registers and processor may not have direct access to manipulate memory and/or. In some cases, RISC processor may include fewer addressing modes than CISC processor to simply hardware components required for decoding and/or executing instructions. In a non-limiting example, instructions may include one or more register-to-register (register-based) operation in which arithmetic and logical operations listed above are performed between registers, and if data is needed from memory and/or, the data may be first loaded into at least one register. In some cases, RISC may be capable of pipeline processing, wherein simple and uniform instruction sets may enable optimal pipeline processing; for instance, subsets of instruction sets may be overlapped. Additionally, RISC may operate only on a smaller number of data types (e.g., integer, float, character, Booleans, pointers, and/or the like). RISC may be configured to perform instruction sets in parallel to increase the rate at which instructions are executed. Exemplary RISC may include, without limitation, ARM, MIPS, POWERPC, SPARC, and the like.

Still referring to FIG. 1, in one or more embodiments, portable ground control station 100 may include CPU dedicated memory, such as CPU dedicated memory and. In one or more embodiments, CPU dedicated memory and/or may include persistent memory. In one or more embodiments, CPU dedicated memory and/or may include temporary memory. In one or more embodiments, inclusion of CPU dedicated memory and/or may improve the efficiency of portable ground control station 100 in comparison to retrieval of information from a general-purpose memory. In one or more embodiments, CPU dedicated memory and/or may include ECC memory. In one or more embodiments, CPU dedicated memory and/or may include 72-bit DDR4 memory. In one or more embodiments, CPU dedicated memory and/or may be accessible only by CPU. In one or more embodiments, CPU dedicated memory and/or may be accessible by GPU 104, CPU, and/or an FPGA.

It is also contemplated that multiple computing devices may be utilized to implement a specially configured set of instructions for causing one or more of the devices to perform any one or more of the aspects and/or methodologies of the present disclosure. Portable ground control station 100 may include a processor and a memory that communicate with each other, and with other components, via a bus. Bus may include any of several types of bus structures including, but not limited to, a memory bus, a memory controller, a peripheral bus, a local bus, and any combinations thereof, using any of a variety of bus architectures.

With continued reference to FIG. 1, processor and/or CPU may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor may be organized according to Von Neumann and/or Harvard architecture as a non-limiting example. Processor may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU 104), general purpose GPU 104, Tensor Processing Unit (TPU), analog or mixed signal processor, Trusted Platform Module (TPM), a floating point unit (FPU), system on module (SOM), and/or system on a chip (SoC).

Memory may include various components (e.g., machine-readable media) including, but not limited to, a random-access memory component, a read only component, and any combinations thereof. In one example, a basic input/output system (BIOS), including basic routines that help to transfer information between elements within portable ground control station 100, such as during start-up, may be stored in memory. Memory may also include (e.g., stored on one or more machine-readable media) instructions (e.g., software) embodying any one or more of the aspects and/or methodologies of the present disclosure. In another example, memory may further include any number of program modules including, but not limited to, an operating system, one or more application programs, other program modules, program data, and any combinations thereof.

Portable ground control station 100 may also include a storage device. Examples of a storage device (e.g., storage device) include, but are not limited to, a hard disk drive, a magnetic disk drive, an optical disc drive in combination with an optical medium, a solid-state memory device, and any combinations thereof. Storage device may be connected to bus by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device (or one or more components thereof) may be removably interfaced with portable ground control station 100 (e.g., via an external port connector (not shown). Particularly, storage device and an associated machine-readable medium may provide nonvolatile and/or volatile storage of machine-readable instructions, data structures, program modules, and/or other data for portable ground control station 100. In one example, software may reside, completely or partially, within machine-readable medium. In another example, software may reside, completely or partially, within processor.

Portable ground control station 100 may also include an input device. In one example, a user of portable ground control station 100 may enter commands and/or other information into portable ground control station 100 via input device. Examples of an input device include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device may be interfaced to bus via any of a variety of interfaces (not shown) including, but not limited to, a serial interface, a parallel interface, a game port, a USB interface, a FIREWIRE interface, a direct interface to bus, and any combinations thereof. Input device may include a touch screen interface that may be a part of or separate from display, discussed further below. Input device may be utilized as a user selection device for selecting one or more graphical representations in a graphical interface as described above.

A user may also input commands and/or other information to portable ground control station 100 via storage device (e.g., a removable disk drive, a flash drive, etc.) and/or network interface device. A network interface device, such as network interface device, may be utilized for connecting portable ground control station 100 to one or more of a variety of networks, such as network, and one or more remote devices connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network, may employ a wired and/or a wireless mode of communication. In general, any network topology may be used. Information (e.g., data, software, etc.) may be communicated to and/or from portable ground control station 100 via network interface device.

Portable ground control station 100 may further include a video display adapter for communicating a displayable image to a display device, such as display. Examples of a display device include, but are not limited to, a liquid crystal display (LCD), a cathode ray tube (CRT), a plasma display, a light emitting diode (LED) display, and any combinations thereof. Display adapter and display may be utilized in combination with processor to provide graphical representations of aspects of the present disclosure. In addition to a display device, portable ground control station 100 may include one or more other peripheral output devices including, but not limited to, an audio speaker, a printer, and any combinations thereof. Such peripheral output devices may be connected to bus via a peripheral interface. Examples of a peripheral interface include, but are not limited to, a serial port, a USB connection, a FIREWIRE connection, a parallel connection, and any combinations thereof.

Still referring to FIG. 1, portable ground control station 100 may include one or more input/output (IO) ports. For instance, and without limitation, portable ground control station 100 may include at least a high-density input and output port communicatively connected to the graphical processing unit and the general-purpose processor. A "high density input and output port," as used in this disclosure, is an input and output port that can transmit and/or receive a large number of bits per clock cycle for a clock regulating overall system, GPU 104, and/or GPP 108. High density input and output port may include, without limitation, a port with a number of lanes above a threshold amount, where, for instance, a four-bit connector is capable of sending four bits in parallel while a 16-bit connector is capable of sending 16 bits in parallel. A high-density port may alternatively or additionally use a higher-speed localized clock to serialize input or output at rates higher than permitted by a system or processor clock; for instance, a parallel-to-serial hardware driver may operate on a localized clock at twice the rate of a GPU 104 and/or GPP 108 clock, permitting transmission of two bits per lane per GPU 104 and/or GPP 108 clock cycle off of a register with twice the number of bits as lanes. As a non-limiting example, a port with 16 bits may be able to send 32 bits per GPP 108 and/or GPU 104 clock cycle out of a 32-bit register supplied by a GPP 108 and/or GPU 104 once per clock cycle, using a localized application-specific integrated circuit (ASIC) and/or field-programmable gate array (FPGA) with a double-speed clock. This may alternatively or additionally be performed using double-edge triggering, such as triggering on rising and falling edges of a clock, triggering using multiple voltage level thresholds, or the like.

Continuing to refer to FIG. 1, and as a non-limiting example, IO ports may include one or more PCIe ports such as PCIe x2, x4, x16 ports, having 2, 4, 8, or 16 lanes respectively; ports with greater numbers of lanes and/or lanes that are not powers of two may be used as well. IO ports may include, as a further non-limiting example, an Ethernet port and/or connector, such as without limitation a 10/100/1000 BASE-T Ethernet downlink-to-switch port. IO ports may include, without limitation one or more serial ports such as a united serial bus 136 (USB) port, including without limitation a USB 3.0 device, a universal asynchronous receiver/transmitter (UART) port, or the like. Registers and/or memory addresses may store data with one or more bits of error correcting code (ECC), such as without limitation 8 bits or more of ECC. ECC bits may be allocated to individual bytes, data words, or the like; for instance, where there are 8 bits of ECC per 64 bits of data, data may be stored, in 72-bit lots, in 64-bit words with 8 ECC bits per word, 32 bit words with 4 ECC bits per word, and/or 1 bit per byte. Alternatively or additionally, further ECC bits may be stored per 32-bit or 64-bit word, and/or additional data resources within data words may be dedicated to one or more ECC protocols. Alternatively or additionally, memory of apparatus and/or multiple apparatuses connected together may be stored redundantly; that is, two or more data records such as words, bytes, or the like may be stored per element of data in different hardware locations. Hardware locations may be on separate buses, in different hardware modules, or the like. In an embodiment, redundant storage may be used to correct errors in more bits than can be corrected using a given ECC protocol; alternatively or additionally, where one memory module used in redundant storage is determined to have corruption above a threshold level, another redundant lot and/or module of memory may be used instead of the corrupted one.

Still referring to FIG. 1, ECC memory may be used to verify data stored in memory and/or identify errors in data stored in memory. Use of ECCs may include encoding of a message or lot of data using redundant information, permitting recovery of corrupted data. An ECC may include a block code, in which information is encoded on fixed-size packets and/or blocks of data elements such as symbols of predetermined size, bits, or the like. An ECC May include Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code. Use of ECCs may enable a datum to be scanned, read, evaluated, and/or verified.

Still referring to FIG. 1, portable ground control station 100 includes a binary unit system 116 (BUS) connecting the GPU 104 to the GPP 108. Bus 116 may include any of several types of bus structures including, but not limited to, a memory bus, a memory controller, a peripheral bus, a local bus, and any combinations thereof, using any of a variety of bus architectures. Components connected by bus 116 may communicate using an API configured to enable the division of processing tasks between the GPP 108, and the GPU 104. In one or more embodiments, an API may allow code to run on varying hardware, such as GPU 104 and/or GPP 108, rather than being limited to a particular hardware architecture. In one or more embodiments, different computing tasks may be performed more efficiently on different architectures. For example, a first computing task may be performed more efficiently on GPU 104 and a second computing task may be performed more efficiently on GPP 108. In another example, a computing task may have multiple components which may be split between GPU 104 and GPP 108, such that all available processing power is used. In one or more embodiments, inclusion of GPU 104, GPP 108, and/or other elements of digital circuit and/or portable ground control station, and division of computing tasks between them; bus 116 may provide improvements to speed and/or efficiency of portable ground control station. bus 116 may include any of several types of bus structures including, but not limited to, a memory bus, a memory controller, a peripheral bus, a local bus, and any combinations thereof, using any of a variety of bus architectures.

With continued reference to FIG. 1, portable ground control station 100 includes a radiofrequency (RF) control channel device having a plurality of radiofrequency (RF) control channels, wherein each RF control channel 120 is configured to control an unmanned aerial vehicle (UAV 128). A "radio frequency control channel" for the purposes of this disclosure is a communication link between two wireless systems using radio waves. In one or more embodiments, RF control channel 120 may allow for communication between two devices wirelessly and/or through various frequencies. In one or more embodiments, RF control channel 120 may include a particular range of radio frequencies allocated for communication of control functions within a wireless system. In one or more embodiments, RF control channel 120 allows an individual or operator to send or receive commands to/from remote devices, such as but not limited to, flight path adjustment, altitude changes and/or the like. In one or more embodiments, portable ground control station 100 may include a plurality of RF control channels 120 wherein each RF control channel 120 may include a unique frequency or set of frequencies assigned for a particular use. In one or more embodiments, commands, signals, communications, and/or the like may be transmitted through RD channel. In one or more embodiments, data transmitted through RF control channel 120 may be converted through a modulation process prior to transmission through the RF control channel 120. In one or more embodiments, a modulation process may encode information (e.g., voice, data, or video) onto a carrier wave, making it suitable for transmission over the RF control channel 120. In one or more embodiments, types of modulation may include amplitude modulation, frequency modification, phase modulation, digital modulation, and/or the like. In one or more embodiments, communications or commands may be transmitted over RF control channel 120 using a particular frequency assigned to control or commands. In one or more embodiments, a receiver may continuously monitor the assigned frequency for incoming communications or commands. In one or more embodiments, RF control channels 120 may operate on specific frequency bands such as but not limited to, 2.4 Ghz or 5.8 Ghz.

With continued reference to FIG. 1, each radio frequency control channel is configured to control an unmanned aerial vehicle (UAV 128). An "unmanned aerial vehicle" as described in this disclosure refers to an aircraft that is capable of being flow within a human pilot on board. Examples, of UAV 128 include but are not limited to, reconnaissance drones configured for surveillance, combat drones armed with weapons (e.g. MQ-9 reaper), Logistics drones (e.g. K-MAX), electronic warfare drones (e.g. RQ-11), target drones (e.g. QF-16), research and development drones and/or any other aerial vehicles capable of flight without a human pilot located on the aerial vehicle. In one or more embodiments, RF control channels 120 may be configured to control UAV 128 wherein commands are sent to UAV 128 through RF signals. In one or more embodiments, UAV 128s may transmit information such, but not limited to, altitude, speed location, sensor information and the like using RF signals. In one or more embodiments, an operator may receive RF signals and communicate new commands or signals to UAV 128 in order to control the UAV 128. IN one or more embodiments, UAV 128s may operate on specific frequency bands wherein UAV 128s may be controlled by transmitting signals or commands through the frequency bands. In one or more embodiments, each RF control channel 120 may be configured to control a particular UAV 128. In one or more embodiments, a plurality of RF control channels 120 may exist wherein each RF control channel 120 may be used to control a similar or differing UAV 128. In one or more embodiments, RF control channels 120 may be configured to control UAV 128s simultaneously, wherein for example, a first RF control channel 120 may control a first UAV 128, and a second RF control channel 120 may control a second UAV 128.

With continued reference to FIG. 1, a device such as portable ground control station 100 may receive or gather information that is set to be transmitted, modulate the information, generate a carrier signal at a particular RF frequency which will carry the modulated information, mixing the modulated information with the carrier signal, and feed the RF signal to an antenna for transmission. In one or more embodiments, UAV 128 may receive the transmission and process commands. In one or more embodiments, UAV 128 may alter a trajectory as a function of the commands, alter a particular target, transmit information back to portable ground control station and/or the like.

With continued reference to FIG. 1, a "radio frequency control channel device" for the purposes of this disclosure is a device configured to implement the functionalities of an RF control channel 120. For example, and without limitation, RF control channel device 124 may include a modulator configured to modulate signals for transmission and/or a demodulator configured to demodulate signals upon receipt of a transmission. In one or more embodiments, RF control channel device 124 may include a processor configured to modulate or demodulate incoming and outgoing transmission. In one or more embodiments, RF control channel device 124 may include a transmitter such as an antenna configured to send commands through the radio frequencies. In one or more embodiments, RF control channel device 124 may include a receiver configured to receive signals from another device. In one or more embodiments, a processor such as CPU, GPU 104 and/or the like may be configured to handle signal processing tasks associated with RF control channels 120 such as but not limited to, encoding, decoding, modulation, demodulation, carrier wave generation, data handling, digital to analog conversions and/or the like. In one or more embodiments, a processor such as CPU, GPU 104 and/or the like may further be configured to implement particular communication protocols.

Still referring to FIG. 1, portable ground control station 100 may include a processor and a memory that communicate with each other, and with other components, via a bus. A bus may include any of several types of bus structures including, but not limited to, a memory bus, a memory controller, a peripheral bus, a local bus, and any combinations thereof, using any of a variety of bus architectures.

Still referring to FIG. 1, in one or more embodiments, portable ground control station 100 may include control and data bus assembly. Control and data bus assembly may connect GPU 104, CPU, and/or other components. Components connected by control and data bus assembly may communicate using an API configured to enable the division of processing tasks between the CPU and the GPU 104. In one or more embodiments, an API may allow code to run on varying hardware, such as GPU 104, CPU, and/or other components, rather than being limited to a particular hardware architecture. In one or more embodiments, different computing tasks may be performed more efficiently on different architectures. For example, a first computing task may be performed more efficiently on GPU 104 and a second computing task may be performed more efficiently on CPU. In another example, a computing task may have multiple components which may be split between GPU 104, and CPU such that all available processing power is used. In one or more embodiments, inclusion of GPU 104 and CPU, and division of computing tasks between them, may provide improvements to speed and/or efficiency of portable ground control station 100.

With continued reference to FIG. 1, one or more logic circuits may be configured for each data protocol and/or RF control channels 120; one or more logic circuits may be implemented in any suitable manner using hardware implementations such as ASIC, FPGA, or the like, edge computing solutions, specialized peripherals, and/or software modules. In one or more embodiments, each logic circuit may be configured to encode information and/or transmission data 144 for each RF control channel 120. In one or more embodiments, each logic circuit may be configured to modulate information into a carrier signal for each RF control channel 120 and/or for each frequency.

With continued reference to FIG. 1, RF control channel device 124 may include a control transmitter 132. A "Control transmitter" for the purposes of this disclosure is a network device configured to convert information into radio waves for transmission. In one or more embodiments, control transmitter 132 may include an edge computer and/or a hardware circuit such as without limitation an FPGA and/or application-specific integrated circuit (ASIC). In one or more embodiments, control transmitter 132 may include any device capable of converting information into radio waves. In one or more embodiments, control transmitter 132 may be responsible for modulation of information prior to transmission. In one or more embodiments, control transmitter 132 may convert radio waves into signals and/or signal into radio waves. In one or more embodiments, control transmitter 132 may include an edge computer configured to modify information based on various protocols and/or the like. In one or more embodiments, control transmitter 132 may be configured to transmit and/or receive information through modular network interface 136. In one or more embodiments, RF control channel device 124 may include a receiver. In one or more embodiments, receiver may be configured to capture incoming communications and/or radio waves and convert them into control signals. In one or more embodiments, receiver may receive incoming radio waves and convert the incoming radio waves into control signals and/or information that may be used by GPP 108. In one or more embodiments, RF control channel device 124 may be configured to process received information and/or information sought to be transmitted. In one or more embodiments, RF control channel device 124 may further serve as a control module. A "Control module" for the purposes of this disclosure is a device configured to process control signals and implement various data protocols. In one or more embodiments, RF control channel device 124 may be configured to modify transmission prior to and/or following transmissions.

With continued reference to FIG. 1, RF control channel device 124 may include more than one control transmitters 132. In an embodiments, each control transmitter 132 may be communicatively connected to each RF control channel 120. For example, and without limitation, a First control transmitter 132 may be communicatively connected to a first RF control channel 120 and a second control transmitter 132 may be communicatively connected to a second RF control channel 120. In one or more embodiments, each control transmitter 132 may be located on a separate logic circuit. In one or more embodiments, each logic circuit may be configured to encode or decode information associated with one RF control channel 120. In one or more embodiments, each control transmitter 132 may include a separate logic circuit configured to encode and decode information associated with a particular frequency and/or RF control channel 120. In one or more embodiments, each control transmitter 132 may be configured for a differing frequency, wherein for example, a first control transmitter 132 may utilize a first data protocol, and a second control transmitter 132 may utilize a second data protocol. In one or more embodiments, each control transmitter 132 may be configured for differing data protocols, wherein for example, a first transmitter may utilize a first data protocol, and a second control transmitter 132 may utilize a second data protocol. Data protocol will be described in further detail below. In one or more embodiments, each control transmitter 132 may be configured for a differing UAV 128. In one or more embodiment, portable ground control station 100 may be configured to control multiple UAV 128s wherein each UAV 128 may be controlled using a separate control transmitter 132. In one or more embodiments, control transmitters 132 may control the same or differing UAV 128s. In one or more embodiments, UAV 128's may differ based on size, shape, the type of data protocol used and/or the like. In one or more embodiments, each control transmitter 132 may include a separate logic circuit configured to modulate and/or demodulate data prior to and/or following a transmission.

In one or more embodiments, RF control channels 120 may utilize data protocols. In one or more embodiments, logic circuits may be configured to modify transmission to adhere to a particular data protocol. In one or more embodiments, RF control channels 120 may include data protocols such as signaling protocols, wherein signaling protocols define the rules for sending control messages, such as set up maintenance and/or teardowns for connections. In one or more embodiments, RC control channels may include data protocols such as access protocols, error correction protocols, and/or the like. In one or more embodiments, radio frequency control channels may utilize various protocols wherein each logic circuit may be configured to convert information to be suitable for a particular radio frequency control channel. Logic circuits may be implemented in any manner described in this disclosure, including using an ASIC, an FPGA, a software module, or the like.

With continued reference to FIG. 1, RF control channel device 124 may be configured to encode information prior to transmission, format information into particular file format to adhere to various data protocol rules as defined by the RF control channel 120, modulate the information, access the channel that will be used for transmission and/or the like.

Figure 2:
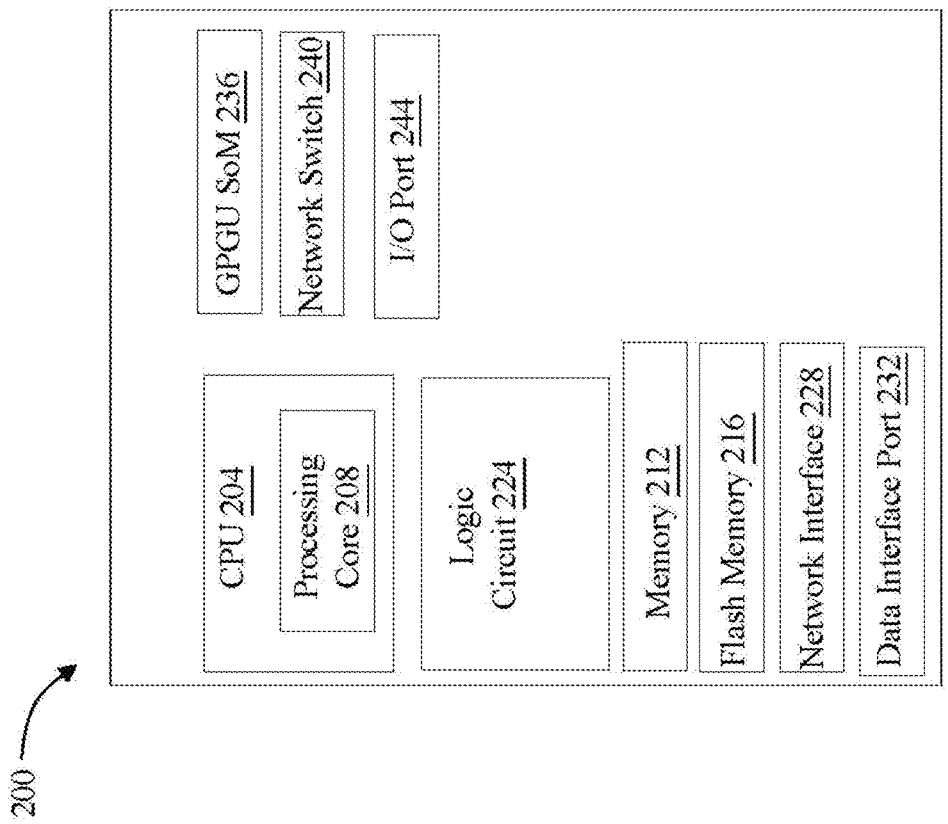
FIG. 2 is a block diagram of an edge computer.

With continued reference to FIG. 1, RF control channel device 124 may include and/or be included in an edge computer as described in reference to at least FIG. 2. In one or more embodiments, edge computer may be configured to perform local processing operations from network devices, sensors, and/or the like. In one or more embodiments, edge computer may be configured to process data from one or more network devices prior to receipt by a processing unit. In one or more embodiments, edge computer may receive data from sensors and/or other external components communicatively connected to portable ground control station 100 and processes data prior to receipt by CPU of GPP 108. In one or more embodiments, Edge computer may perform one or more processes as described in this disclosure. In one or more embodiments, portable ground control station 100 may include edge computer, wherein edge computer may be configured to perform one or more tasks as described in this disclosure. In one or more embodiments, RF control channel device 124 may include Edge computer. Edge computer is described in further detail below.

With continued reference to FIG. 1, RF control channel device 124 may be configured to send and/or receive data through and/or from a modular network interface 136. In one or more embodiments, RF control channel device 124 may include a modular network interface 136. A "modular network interface" for the purposes of this disclosure refers to a networking component capable of communicating with more than one communication networks. For example, and without limitation, modular network interface 136 may be capable of communicating through Wi-Fi, satellite internet, Ethernet, and/or the like. A "communication network" for the purposes of this disclosure is a system that enables the exchange of data between devices or systems. Communication networks may be wired, wireless and/or a combination of both. In one or more embodiments, communication networks may include, but are not limited to, Local area networks, Wide area networks, data center networks, cloud networks, wireless networks, Wi-Fi, 3G, 4G, 5G, Bluetooth, radio access networks, fiber optic networks, satellite networks, microwave networks, ethernet networks, optical transport networks, virtual networks, Tactual data links, satellite communication networks (SATCOM), mobile ad-hoc networks, mesh networks, high-frequency radio networks, edge computing networks, space-based networks and/or any other network in which data may be exchanged. In one or more embodiments, communication networks may include frequency ranges, such as, but not limited to, 2.4 GHz, 5.8 Ghz, 433 Mhz, 868 Mhz, 915 MhZ, and/or the like. In one or more embodiments, communication networks may include radio networks operating on various frequencies ranging from 100 Mhz to 10 Ghz. In one or more embodiments, processor may receive transmission data 144 to be transmitted. In one or more embodiments, systems and/or software may transmit information to modular network interface 136, wherein data may be transmitted through modular network interface 136 and/or received through modular network interface 136. In one or more embodiments, modular network interface 136 may include one or more network interface devices. Network interface device may be utilized for connecting computing device or apparatus to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A communication network may employ a wired and/or a wireless mode of communication. In one or more embodiments, network interface devices may include an RJ-45 connector. In one or more embodiments, an RJ-45 connected may be used to ethernet networking. In one or more embodiments, modular network interface 136 may include 4-45 ports wherein multiple ethernet connections may be utilized at the same time. In one or more embodiments, modular network interface 136 may include 4 RJ-45 10/100/1000 Ethernet ports wherein the 4 ethernet pots support ethernet standards 10BASE-T, 100BASE-TX and 1000BASE-T. In one or more embodiments, modular network interface 136 may include 2 RJ-45 1000/10000 ethernet, wherein the 2 ports support gigabit ethernet and 10 gigabit ethernet. In one or more embodiments, network interface device and/or modular network interface 136 may include two small form-factor pluggable (SFP) SR Optics LC fiber modules ports. In one or more embodiments, SFP ports may allow for data communications. In one or more embodiments, the SFP ports may transmit data at 10 gigabytes per second (Gbps). In or more embodiments, SFP port may include an optical transceiver designed for short range communication. In one or more embodiments, SFP port may include LC fiber modules. In one or more embodiments, network interface device may further include 2 LC Fiber Optics 1000SX SR Optics ports. In one or more embodiments, the LC ports may include the use of LC connectors for fiber optics. In one or more embodiments, LC ports may allow for gigabit ethernet connections over short distances using fiber optics. In one or more embodiments, modular network interface 136 may be capable of layer 3 virtual appliance networking. In one or more embodiments, modular network interface 136 may be configured to route packets across networks. In one or more embodiments, modular network interface 136 may be configured to interface with virtual routers and/or virtual firewalls that operate at layer 3. In one or embodiments, modular network interface 136 may include but are not limited to routers, switches, hubs, Access points, modems, gateways, bridges, network interface cards, proxy servers, DNS servers, satellite modems, satellite dish, radio transceivers, microwave antennas, cellular modems, cellular towers, radio gateways, equipment for radio access networks and/or any other devices that may communicate through a communication network.

With continued reference to FIG. 1, modular network interface 136 may include one or more removable network components. A "Removable network component" for the purposes of this disclosure refers to a network interface device capable of being removably connected to modular network interface 136. For example, and without limitation, LAN cards may be removed from modular network interface 136 and replaced with other interface devices. In one or more embodiments, modular network interface 136 may be configured to receive a plurality of network interface devices, wherein network interface devices may be interchanged based on the needs of portable ground station 100. In one or more embodiments, removable network components may include tactical radios, layer 3 switches, antennas, encryptions units, various network interface cards and/or the like. In one or more embodiments, removable network components may include any network components that may allow for communication or connection to communication network. In one or more embodiments, removable network component may include an SFP port. In one or more embodiments, SFP may be added to modular network component and/or removed based on the current needs of portable ground control station 100. In one or more embodiments removable network components may include multiband radios, high frequency radios, ultra-high frequency radios, satellite radios, link 16 tactical data links and/or the like. In one or more embodiments, modular network interface 136 may include removable slots that allow for removable network components to be placed within, and/or removed from, modular network interface 136. In one or more embodiments, removable network components may be attached to modular network interface 136 through one or more ports as described above. In one or more embodiments, removable network components may be communicatively connected to modular network interface 136 through the use of USB connections, ethernet connections and/or serial connections. In one or more embodiments, modular network interface 136 may include USB ports, ethernet ports, or serial connections wherein removable network components may connect to modular network interface 136. In one or more embodiments, modular network interface 136 may include express card slots, PCMIA slots, serial interfaces (e.g. RS-232 or RS-485), ethernet ports, and/or any other connection interfaces that may allow for connection of removable interface components to modular network interface 136. In one or more embodiments, removable network component may include small form-factor pluggable module. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture. In one or more embodiments, portable ground station 100 may include computing device.

With continued reference to FIG. 1, modular network interface 136 may include an antenna. In one or more embodiments, antenna may be configured to send and/or receive radio waves or radio signals. In one or more embodiments, Antenna may include a dipole antenna, a patch antenna, an omnidirectional antenna, a blade antenna, and/or the like.

With continued reference to FIG. 1, modular network interface 136 may include a plurality of network devices (as described in further detail below). In one or more embodiments, network devices may include and/or be consistent with removable network components. In an embodiment, each network device may be configured to connect to a differing communication network. For example, and without limitation, a first network device may be configured to connect to A 3G network, while a second network device may be configured to connect to a radio network. In one or more embodiments, at least one network device may include an antenna, a router, a switch, and/or the like. In one or more embodiments, at least one network device may be configured to communicate with an aerial device. An "aerial device" for the purposes of this disclosure refers to a device that is capable of being airborne. For example, and without limitation, aerial device may include UAV 128 as described above. In one or more embodiments, network device may be configured to communicate with aerial device wherein communications may be made between portable ground control station and UAV 128. In one or more embodiments, network device configured to communicate with aerial device may include network device of such communication such as an antenna, a satellite, and/or the like. In one or more embodiments, modular network interface 136 may include another and/or second network device configured to communicate with a terrestrial device 140. A "Terrestrial device" for the purposes of this disclosure is a device that is located is not airborne. For example, and without limitation, terrestrial device 140 may include a database, a server, a cloud network, a remote device such as a phone and/or the like. In one or more embodiments, terrestrial device 140 may include any device that is not capable of being airborne. In one or more embodiments, terrestrial devices 140 may be configured to communicate through particular communication network such as 3G, 4G, 5G, Wi-Fi and/or the like whereas aerial devices may be limited to radio and/or satellite communications. In one or more embodiments, modular network interface 136 may include both network devices configured to communicate with aerial and terrestrial devices 140 wherein portable ground control station 100 may be capable of communicating with both aerial devices and terrestrial devices 140. In one or more embodiments, portable ground control station 100 may be capable of routing communications from aerial devices to terrestrial devices 140.

With continued reference to FIG. 1, RF control channel device 124 may be included within modular network interface 136. In one or more embodiments, one or more processes or steps by RF control channel device 124 as described in this disclosure may be performed by modular network interface 136. In one or more embodiments, modular network interface 136 may include a computing system and/or edge computer configured to process transmissions at the source. In one or more embodiments, modular network interface 136 may include a plurality of logic circuits and perform one or more operations on transmissions such as transmission data 144. In one or more embodiments, modular network interface 136 May perform any operations assigned to RF control channel device 124 as described in this disclosure. In one or more embodiments, modular network interface 136 may include logic circuits configured to perform one or more steps as described in this disclosure. In one or more embodiments, modular network interface 136 may include edge computer.

With continued reference to FIG. 1, modular network interface 136 is configured to transmit and/or receive transmission data 144. "Transmission data" for the purposes of this disclosure is information that is to be transmitted from one device to another. For example, and without limitation, transmission data 144 may include a transmission containing a text, a video message, a command, a control signal. an update to an existing software and/or the like. In one or more embodiments, transmission data 144 may include, but is not limited to, information received from a sensing device, information received through modular network interface 136, information received from CPU and/or the like. In one or more embodiments, transmission data 144 may include any information passing through modular network interface 136, RF control channel device 124 and/or GPP 108. In one or more embodiments, transmission data 144 may include information such as but not limited to, additional software capabilities, additional system requirements, changes to one or more processes within a system, changes to the visual design of a system, changes to the user interface of a system and the like. In one or more embodiments, transmission data 144 may be used to correct instructions and/or code on a software, to modify the capability of a software and the like. In one or more embodiments, transmission data 144 may include information associated with a software that is to be modified. This may include but is not limited to the name of the software, compatibility information, system requirements, the date in which transmission data 144 was generated for the software, the version number of transmission data 144, information indicating potential changes to the software, information indicating additions to the software and the like. In one or more embodiments transmission data 144 may include modifications to, and/or commands to or from, a weapons system such as but not limited to, guided missile systems, smart bombs, automated defense systems, unmanned aerial vehicles, threat identification systems, Artificial intelligent algorithms, weapons, operational flight programs, avionics systems and the like. In one or more embodiments, transmission data 144 may include modifications to an operating system, modifications to an operating system used for aviation, modifications to an aviation system, modifications to aircraft systems and the like. In one or more embodiments, transmission data 144 may include communications made between two or more computing devices, such as but not limited, textual communications, audio communications, video communications and/or the like. In one or more embodiments, transmission data 144 may include information received from recording devices such as, but not limited to, sensors, video cameras and/or any other device capable of recording information.

With continued reference to FIG. 1, transmission data 144 may include, and/or be associated with, a design assurance level (DAL) classification. A "design assurance level classification," for the purposes of this disclosure in a labeling of software based on the effects caused by a failure of the software. For example, and without limitation, a software failure associated with a first software which can potentially put human lives at risk may receive a particular classification whereas a software failure associated with a second software which may, at most, slightly injure an individual may be given a differing classification. In one or more embodiments, each software may be associated with a particular DAL classification. DAL classification may range from A-E wherein a DAL-A classification may indicate the software may cause death during failure, whereas as a DAL-E classification may indicate that there is no potential harm in the event of a software failure. In one or more embodiments, various software may be given classifications based on their inherent risk to cause harm to individuals. In one or more embodiments, the DAL of a software may indicate that one software may require more testing, safety protocols and the like in comparison to other software. For example, a DAL-E classified software may not require much testing as failure may not harm individuals, whereas a DAL-A may require stringent testing to ensure that failure does not occur. In one or more embodiments, each DAL classification may contain minimum resource requirements such as minimum processing power, minimum space allocation, and the like. In one or more embodiments, transmission data 144 may contain a DAL classification, wherein the DAL classification indicates the type of system or software in which transmission data 144 was received from. In one or more embodiments, DAL classification may be determined based on the source of transmission data 144. For example, and without limitation, transmission data 144 may contain the same DAL classification as the device from which it was transmitted.

In one or more embodiments, transmission data 144 includes metadata. "Metadata" for the purposes of this disclosure refers to descriptive information about a particular set of data. For example, and without limitation, metadata may include a file size, a creation date, a source of transmission data 144 and/or the like. In one or more embodiments, metadata may include header information wherein the header information may include information indicating how to process, route or interpret transmission data 144. In one or more embodiments, header information may include a source address, a destination address, protocol information indicating the protocol data used or required, the sequence numbers and/or the like. In one or more embodiments, transmission data 144 may include a payload, wherein the payload corresponds to the actual data being transmitted. In one or more embodiments, each transmission within a network may include the actual file and the header information. In one or more embodiments, the header information may include the source of the file, the destination of the file, the particular network protocol being used and/or the like. In one or more embodiments, header information may be used to guide data and/or packet through a network and ensure that it reaches its destination. In one or more embodiments, header information may include but is not limited to, the source and destination of transmission data 144, frame types, the source IP address, the destination IP address, the time to live, and/or the transport protocol, she source port, the destination port, the sequence numbers and/or the like.

With continued reference to FIG. 1, In one or more embodiments, header information may include a source protocol and a target protocol. A "source protocol" for the purposes of this disclosure refers to a data protocol in which transmission data 144 was received in. A "Target protocol" for the purposes of this disclosure refers to the data protocol in which transmission data 144 should be used for routing to a destination or recipient. In one or more embodiments, source protocols and target protocols may differ wherein systems or networks attempting to communicate with one another may utilize differing data protocols.

With continued reference to FIG. 1, transmission data 144 may include a data packet. A "data packet" for the purposes of this disclosure is a unit of data carried from one device to another over a communication network. In one or more embodiments, data packet may include the payload, the header information, routing information indicating how the data packet should be transmitted, and/or the like. In one or more embodiments, transmission data 144 may be received from modular network interface 136 wherein transmission data 144 may be received in the form of data packets. In one or more embodiments, transmission data 144 may be received from a system operating on GPP 108 wherein transmission data 144 may include a data file that requires segmentation into data packets.

With continued reference to FIG. 1, transmission data 144 may include commands and/or control signals that will be communicated and/or have been communicated to UAV 128. In one or more embodiments, commands and/or control signals may include commands to alter a trajectory of UAV 128, a command to receive information from UAV 128, a command to record information on UAV 128 and/or the like. In one or more embodiments, transmission data 144 may further include information received from UAV 128, such as but not limited to, video data captured from a camera onboard UAV 128, telemetry information captured from onboard UAV 128, GPS location of UAV 128, information received from one or more sensors onboard UAV 128 and/or the like. In one or more embodiments, transmission data 144 may include any information received and/or processed by UAV 128.

With continued reference to FIG. 1, in one or more embodiments, transmission data 144 may include flight commands 148 sent to UAV 128. A "flight command" as described in this disclosure refers to a specific set of introductions that is capable of controlling the operation of behavior of an aerial vehicle. For example, and without limitation, flight command 148 may include instructions to activate a camera onboard UAV 128. In one or more embodiments, commands may include but are not limited to, takeoff commands, landing commands, navigation commands, commands to change altitude, commands to change directions, commands to activate cameras and/or sensors, commands to capture images or videos, commands to release payloads, commands to start or stop various onboard systems (e/g. sensors, communications, cameras and the like), commands to receive information relating to UAV 128 (e.g. battery level, GPS status, sensor reading), commands to return home and/or the like.

With continued reference to FIG. 1, flight commands 148 may include information transmitted to UAV 128. In one or more embodiments, transmission data 144 may include and/or encompass information that is both transmitted and/or received by UAV 128. In one or more embodiments, flight commands 148 may be transmitted to UAV 128, wherein transmission data 144 may be received by UAV 128. In one or more embodiments, transmission data 144 may include flight commands 148, wherein transmission data 144 may be transmitted to UAV 128 and transmission data 144 may include information received by UAV 128 as a result of flight commands 148. In one or more embodiments, transmission data 144 may include information received from UAV 128, such as but not limited to, information received from a camera on board UAV 128, information associated with telemetry, speed, acceleration, altitude, battery levels, and/or any information that may be recorded and/or processed by UAV 128. In one or more embodiments, a communication and/or signal received from UAV 128 in connection to a flight command 148 may be referred to as a "flight response". In one or more embodiment, transmission data 144 may include flight response. In one or more embodiments, flight response may include communications made from UAV 128 in response to a flight command 148 received. In one or more embodiments flight response may include any information that is received from UAV 128. In one or more embodiments, flight response may include any information within transmission data 144.

With continued reference to FIG. 1, modular network interface 136 is configured to send and/or receive transmission data 144 in the form of a modulated carrier signal 152. "Modulated carrier signal" for the purposes of this disclosure refers to a radio wave that has been modified to carry information. For example, and without limitation, transmission data 144 may be converted into modulated carrier signal 152 wherein modulated carrier signal 152 may include a radio wave that has been modified to contain transmission data 144. In one or more embodiments, modulated carrier signal 152 may include information that is encoded in the amplitude of the carrier wave, information encoded in the frequency variations of the carrier wave, information encoded in the phase change of the carrier wave, information encoded in changes between frequency levels and/or the like. In one or more embodiments, transmission data 144 may be converted into a modulated carrier signal 152 prior to transmission in order to transmit information to or from ground portable station 100 to UAV 128. In one or more embodiments, modulated carrier signal 152 may be generated in the form of a radio frequency signal. In one or more embodiments, modulated carrier signal 152 is sent to antenna, wherein antenna converts the electrical radio frequency into electromagnetic waves which are then radiated into the air and received by UAV 128. IN one or more embodiments, the electromagnetic waves are propagated through the air and ultimately received by UAV 128. Additionally or alternatively, modular network interface 136 may be configured to receive modulated carrier signal 152 through antenna. In one or more embodiments, a device, such as RF control channel device 124 may be configured to extract transmission data 144 from modulated carrier signal 152.

With continued reference to FIG. 1, transmission data 144 may be transmitted and/or received in the form of modulated carrier signal 152 through or from modular network interface 136. In one or more embodiments, modulated carrier signal 152 may be demodulated by RF control channel device 124 and/or UAV 128 in order to extract and identify transmission data 144. In one or more embodiments, each logic circuit may be configured to demodulate a particular incoming modulated carrier signal 152. In one or more embodiments, modulated carrier signal 152 may differ for each RF control channel 120. In one or more embodiments, transmission data 144 may be converted into a differing modulated carrier signal 152 for each RF control channel 120. In one or more embodiments, at least one logic circuit may be configured to identify the modulation type (e.g. AM, FM, PSK, FSK, etc.), the frequency, the amplitude and/or the like and select at least one logic circuit suitable for demodulating modulated carrier signal 152 into transmission data 144. In one or more embodiments, a process of decoding transmission data 144 may include a process or receiving a modulated carrier signal 152 and decoding the modulated carrier signal 152 to extract transmission data 144.

With continued reference to FIG. 1, RF control channel device 124 is configured to receive transmission data 144 and identify at least one logic circuit from a plurality of logic circuits for use in decoding transmission data 144. In one or more embodiments, transmission data 144 includes header information wherein RF control channel device 124 may select or identify a particular logic circuit based on header information. In one or more embodiments, header information may include information indicating the data protocol format in which transmission data 144 was received. In one or more embodiments, RF control channel device 124 may select at least one logic circuit pertaining to the particular data protocol in order to decode transmission data 144. For example, and without limitation header information may indicate that transmission data 144 was received in a Link-16 protocol wherein logic circuit associated with Link-16 protocol may decode transmission data 144. In one or more embodiments, RF control channel device 124 may identify at least one logic circuit for transmission data 144 by identifying header information with transmission data 144. In one or more embodiments, a separate logic circuit may be used to parse header information. In one or more embodiments, when a particular data packet and/or transmission data 144 is detected, the appropriate logic circuit is triggered for decoding. In one or more embodiments, once the header information is parsed and the specific data protocol is identified, RF control channel device 124 dynamically routes transmission data 144 to the appropriate logic circuit suitable for decoding transmission data 144.

With continued reference to FIG. 1, RF control channel device 124 is configured to decode transmission data 144. "Decoding" for the purposes of this disclosure refers to the process of interpreting encoded data and extracting any relevant information from the encoded data. In one or more embodiments, decoding may include header extraction wherein a decoder, such as a logic circuit, may isolate the der portion of the data packet and identify protocols, source addresses, destination addresses and/or the like. In one or more embodiments, RF control channel device 124 may be configured to decode transmission data 144 by utilizing one or more logic circuits configured to decode transmission data 144. In one or more embodiments, decoding may include a process of protocol matching wherein a logic circuit may identify a protocol within transmission data 144 and identify a logic circuit configured specifically to process those data protocols. In one or more embodiments, a process of decoding may further include a process of isolating the header information from the payload. In an embodiment, the payload may contain the actual file data while the header information includes metadata of the actual file. In one or more embodiments, a process of decoding may include using length fields within header information to determine how much data should be extracted from the payload. In one or more embodiments, a process of decoding may include error handling. In one or more embodiments, a process of decoding may include interpreting the payload based on the rules as defined by the relevant data protocol. In one or more embodiments, a process of decoding may further include preparing the data packet and/or transmission data 144 for transmission to another device. For example, and without limitation, transmission data 144 may be routed to GPP 108 following extraction of the payload. In one or more embodiments, decoding may further include encoding transmission data 144 to another data protocol based on the destination address listed within the header information. In one or more embodiments, one or more logic circuits may identify target protocol and convert transmission data 144 to a data protocol similar to that of target protocol.

With continued reference to FIG. 1, a process of decoding transmission data 144 may include a process of demodulating transmission data 144 wherein transmission data 144 is demodulated such that it may be read by processor. In one or more embodiments, a process of deciding transmission data 144 may include receiving modulated carrier signal 152 and extracting transmission data 144 from modulated carrier signal 152. For the purposes of this disclosure, "demodulate" or "a process of demodulating" refers to a process of converting information in the form of a radio wave to its original format. For example, and without limitation, transmission data 144 may be converted into a radio wave for transmission, wherein transmission data 144 may be suitable for transmission over a particular radio frequency. In one or more embodiments, transmission data 144 may be converted into a modulated carrier signal 152 prior to transmission over a communication network, wherein demodulating may include converting the modulated carrier signal 152 back into transmission data 144.

With continued reference to FIG. 1, additionally or alternatively, RF control channel device 124 may be configured to encode transmission data 144. For the purposes of this disclosure, "encode" or a "process of encoding" refers to a process in which information is modified or formatted such that it is suitable for transmission over a communication network. For example, and without limitation, transmission data 144 may be encoded into data packets and/or into radio waves where transmission data 144 may be transmitted over communication network. In one or more embodiments, transmission data 144 may be encoded wherein transmission data 144 may be modified to adhere to the data protocol associated with the communication network in which transmission data 144 will be transmitted through. In one or more embodiments, a process of encoding transmission data 144 may include modulating transmission data 144 into a modulated carrier signal 152. In one or more embodiments, modulating transmission data 144 may include modifying a carrier wave to include information contained within transmission data 144. In one or more embodiments, a process of modulating transmission data 144 may include a process of converting transmission data 144 into a modulated carrier signal 152. In one or more embodiments, each RF control channel 120 may require the use of a particular data protocol or modulated carrier signal 152 wherein each logic circuit may be configured to modify transmission data 144 appropriately.

With continued reference to FIG. 1, in one or more embodiments decoding transmission data 144 may include converting transmission data 144 from a first data protocol to a second data protocol. In one or more embodiments, the first data protocol and the second data protocol may differ. In one or more embodiments, RF control channel device 124 may serve as a bridge between two disparate systems or networks. In one or more embodiments, one or more logic circuits may be configured to convert transmission data 144 from one data protocol to another. In one or more embodiments, a process of converting transmission data 144 may include changing header information to match the target protocol and/or modifying or interpreting transmission data 144 according to the rules of new protocol. In one or more embodiments, a first logic circuit may be configured to decode transmission data 144 from a first data protocol and a second logic circuit may be configured to encode transmission data 144 following the rules of the target protocol. In one or more embodiments, logic circuit may be configured to reformat data structures, modify field sizes or data types, implement specific encoding or compression formats as defined by the new or second data protocol and/or the like. In one or more embodiments, a first logic circuit may identify the source protocol within header information, wherein the first logic circuit may route transmission data 144 to the appropriate logic circuit used for conversion of the transmission data 144 having the particular data protocol.

With continued reference to FIG. 1, RF control channel device 124 may contain routing tables in order to determine a data protocol associated with the destination of transmission data 144. In one or more embodiments, routing tables may map destination addresses to specific protocols. For example, and without limitation, routing to GPP 108 may require a specific data protocol while routing to GPU 104 may require a differing data protocol. In one or more embodiments, RF control channel device 124 may be configured to receive transmission data 144 in a plurality of differing data protocols yet be configured to convert transmission data 144 to a particular protocol based on its destination. In one or more embodiments, RF control channel device 124 may be configured to receive a predetermined set of data protocols wherein RF control channel device 124 may be pre-coded to convert said data protocols to a specific format. In one or more embodiments, based on the communication network and/or network interface device in which transmission data 144 was received through, transmission data 144 may be received in a particular data protocol. In one or more embodiments, one or more logic circuits may be configured to convert transmission data 144 from one data protocol into another data protocol suitable for GPP 108 to understand.

With Continued reference to FIG. 1, RF control channel device 124 may be preprogrammed to output or route data using a specific data protocol. In one or more embodiments, RF control channel device 124 and/or logic circuits may identify data protocols of incoming data, such as transmission data 144 and convert the incoming data to a particular and prespecified data protocol. In one or more embodiments, the prespecified protocol may be one that is understood by GPP 108 and/or other components of portable ground control station 100.

With continued reference to FIG. 1, RF control channel device 124 may be configured to communicate with a virtual network interface. A "Virtual network interface" for the purposes of this disclosure is a virtual representation of a physical network which allows virtual machines, containers or other isolated environment to connect to an external network. In one or more embodiments, virtual networks may serve as a bridge between physical networks and isolated environments. In one or more embodiments virtual network interfaces allow for isolated environments, such as operating environment (as described in this disclosure) to communicate with physical networks. In one or more embodiments, a virtual network interface may emulate the behavior of a physical network interface card. In one or more embodiments, each isolated environment and/or operating environment may contain its own virtual network interface. In one or more embodiments, one or more virtual machines and/or operating environments operating on GPP 108 may include and/or communicate with a virtual network interface. In one or more embodiment, virtual network interface may include a virtualized network device that is used to forward packets based on flow rules or routing traffic between different network segments. In one or more embodiments, virtual network device may operate on a server, wherein the server acts a forwarding engine, analyzing header information and forwarding or routing them based on policies and flow rules. In one or more embodiments, virtual network device may be used to identify information that is being transmitted through a network and/or from operating environments.

With continued reference to FIG. 1, RF control channel device 124 may be configured to transmit or route transmission data 144 to a virtual network interface. In one or more embodiments, one or more operating environment may be communicatively connected to the virtual network interface. In one or more embodiments, RF control channel device 124 may be configured to convert transmission data 144 from one data protocol to another RF control channel device 124 may be configured to route transmission data 144 through the virtual network interface using the policies or data protocols of the virtual network interface. In one or more embodiments, RF control channel device 124 may communicate with a hypervisor in order to route transmission data 144 to one or more virtual environments.

With continued reference to FIG. 1, RF control channel device 124 may be configured to convert transmission data 144 in order to route transmission data 144 through a dedicated communication protocol. A "dedicated communication protocol" for the purposes of this disclosure refers to a set of rules designed for specific communication tasks between systems. In one or more embodiments, dedicated communication protocol may include a data protocol configured specifically for communication between RF control channel device 124 and GPP 108, RF control channel device 124 and modular network interface 136, RF control channel device 124 a, first processor core and/or the like. In one or more embodiments, dedicated communication protocol may include a data protocol preselected by an individual for use within transmission received by RF control channel device 124. In one or more embodiments, dedicated communication protocols may include a set communication standard between two devices or systems. In one or more embodiments, dedicated communication protocol may include communication between physical Buses, communication between specific serial interfaces, communication between high speed serial protocols, and/or the like. In one or more embodiments, dedicated communication protocol may include a data protocol configured specifically for a software operating on GPP 108. In one or more embodiments, RF control channel device 124 may route data to a dedicated communication protocol wherein the dedicated communication protocol is configured exclusively to transfer data between RF control channel device 124 and another component of portable ground control station 100. This may include, but is not limited to, the use of digital signals, the use of data packets, the use of memory-mapped data and/or the like. In one or more embodiments, dedicated communication protocol may include any preestablished data protocol between two or more components within portable ground control station 100.

With continued reference to FIG. 1, RF control channel device 124 and/or logic circuits may be programmed and/or configured to serve as a network controller. A "network controller" for the purposes of this disclosure refers to a system responsible for observing or controlling the behavior of one or more communication networks. In one or more embodiments, network controller may receive data that is ready for transmission and make routing decisions based on the state of current networks that are available. In one or more embodiments, network controller may dictate policies for a particular communication network. In one or more embodiments, network controller may monitor network traffic, utilization, bandwidth security issues and/or the like.

With continued reference to FIG. 1, network controller may be configured to identify network devices on one or more communication networks. In one or more embodiments, network controller may identify a particular communication network in which transmission data 144 may be routed through. A "network device" for the purposes of this disclosure is a computing device and/or physical or virtual component thereof that is communicatively connected to system by a network connection. In one or more embodiments, network device may enable communication between a computing device and a communication network. In one or more embodiments, network devices may include but are not limited to routers, switches, hubs, Access points, modems, gateways, bridges, network interface cards, proxy servers, DNS servers, satellite modems, satellite dish, radio transceivers, microwave antennas, cellular modems, cellular towers, radio gateways, equipment for radio access networks and/or any other devices that may allow computing device to communicate through a communication network. In one or more embodiments, network device may include network interface device as described above. In one or more embodiments, network controller may identify network devices in order to determine a particular communication network and/or path for transmission data 144. In one or more embodiments, network controller may utilize a link layer discovery protocol (LLDP) in order to identify network devices on or more communication networks. "Link layer discovery protocol" as described in this disclosure refers to a network discovery protocol that is used to detect neighboring network devices in a network. In one or more embodiments, network controller may dynamically discover devices by identifying LLDP messages that have been transmitted from said devices. In one or more embodiments, network controller may identify network devices on communication network through discovery protocols such as but not limited to, openflow, simple network management protocol, network agents operating on network devices, through application program interfaces and/or the like. In one or more embodiments, network controller may be configured to identify virtual networks operating on GPP 108. In one or more embodiments, network controller may identify network switches, virtual switches, virtual network interfaces, overlay networks and/or the like, wherein network controller may communicate with the virtual devices. In one or more embodiments, network devices may automatically transmit communications, wherein network controller may receive communications and identify network device.

With continued reference to FIG. 1, network controller may further include one or more software defined intelligent networking (SDIN) systems. "Software defined network" (SDN) for the purposes of this disclosure is a system in which virtual networks can be created to direct traffic on a network. In contrast to hardware devices such as routers which may control a network through hardware, SDN may be used to control a network through software. In one or more embodiments, SDN may be used to control a network wherein data packets may be routed using SDN. In one or more embodiments, SDN may act as an intermediary between an application or software and a network wherein the SDN may control the software interacts with the network. SDN may be used to monitor and control network conditions. In one or more embodiments, SDN may be used to manage network resources for various software containers or operating environments. Software containers may be limited in network resources due to their level of importance; such that less important software containers do not crowd a network for less important matters. "Software defined intelligent network" (SDIN) for the purposes of this disclosure. is an SDN which utilizes artificial intelligence and machine learning to optimize the performance of a network. In SDIN, machine learning may be used to predict issues, predict network demands and adjust the network accordingly. In some cases, SDIN may be used to ensure that software containers or operating environments do not interact with one another. An SDIN controller may be used to interact with a network. The SDIN controller may monitor network traffic and make decision to optimize traffic for software container. In one or more embodiments, SDIN may ensure enable dynamic mesh networks, and facilitate assured, secure data sharing across Link-16, BFT, 4586, and RAC2.

With continued reference to FIG. 1, network controller may identify network devices by transmitting one or more discovery requests. A "discovery request" for the purposes of this disclosure refers to a transmission or request made by network controller to identify available network devices on one or more communication networks. For example, and without limitation, network controller may transmit a broadcast to announce its presence and seek information from other network devices. In one or more embodiments, discovery request may include a request to receive information from other network devices on communication networks. In one or more embodiments, network devices may respond to discovery request with information about capabilities, configuration, status and/or the like. In one or more embodiments, discovery request may include a request for information such as but not limited to, a device types, the services offered, the capabilities (e.g. bandwidth, protocols supported, whether the network is active or idle and/or the like. In one or more embodiments, network devices that receive discovery request may transmit information such as but not limited to, a device identifier, services offered, configuration details and/or the like. In one or more embodiments, network controller may identify network devices based on responses given to discovery request. In one or more embodiments, network controller may support multiple network protocols or discovery protocols simultaneously in order to identify network devices on disparate networks. In one or more embodiments, processor and/or network controller may be configured for multiple protocols through software configuration and/or virtualization. In one or more embodiments, network controller may include a virtual network controller, wherein the virtual network controller includes a virtualized software emulating a network controller. In one or more embodiments, virtual network controller may transmit discovery requests based on the network type it is addressing. For example, and without limitation, a particular discovery request may be made for a radio network and a differing discovery request may be made for an ethernet based network.

With continued reference to FIG. 1, RF control channel device 124 and/or network controller may be configured to identify a congestion datum. A "congestion datum" for the purposes of this disclosure refers to information about the performance or availability of a communication network. In one or more embodiments, congestion datum may include latency measurements, wherein latency measurement includes the time it takes for data packets to travel between two points in a network. In one or more embodiments, congestion datum may include throughput analysis wherein network controller may identify the amount of data being transmitted over a network segment. In one or more embodiments, congestion datum may include packet loss wherein congestion datum may include the number of packets being lost. In an embodiment, packet loss may indicate that a network may be congested. In one or more embodiments, congestion datum may include utilization, wherein utilization may indicate bandwidth usage across a network. In an embodiment, if utilization is consistently high, then the network may be configured. In one or more embodiments, congestion datum may be used to evaluate the performance of a network and whether it is suitable for transmission of transmission data 144. In one or more embodiments, congestion datum may indicate if a network is active and capable of sending and/or receiving transmission. In one or more embodiments, congestion datum may include error rates, wherein error rates indicate packet loss and error rates when transmitting information. In one or more embodiments, discovery request may include a request to receive information associated with congestion datum wherein network devices responding to network request may provide congestion datum. In one or more embodiments, network controller may make an SNMP request to receive information such as GPP 108 load, memory usage and/or the like. In one or more embodiment, discovery request may be transmitted to a plurality of network devise wherein network devices may respond with congestion datum and/or a portion thereof. In one or more embodiments, network controller may identify congestion datum by attempting to transmit information through a particular network device and/or communication network. In an embodiment, network controller may calculate various elements of congestion datum by transmitting data packets and monitoring receipt of the data packets.

With continued reference to FIG. 1, congestion datum may further include a various security status of each network device. For example, and without limitation, network devices may transmit whether they contain firewalls, built in security mechanisms to monitor vulnerabilities, intrusion detection mechanisms, firmware integrity checks and/or the like. In one or more embodiments, congestion datum may include a security status of each network device wherein each network device may report how secure the network device is. In one or more embodiments, network device may report that they support secure communication protocols, they are compatible with various security measures, that they have monitoring systems for threat detection and/or the like. In one or more embodiments, congestion datum may include these security features wherein network controller may select network devices based on the security requirement of transmission data 144 118. For example, and without limitation, transmission priority and/or metadata may indicate that transmission data 144 may only be transmitted through secure and/or encrypted networks wherein congestion datum may indicate which network devices adhere to any requirements posed by transmission data 144. In one or more embodiments, congestion datum may further include connected device to network device wherein processor may determine if a path exists if network device is connected to other network devices. In one or more embodiments, processor may be configured to query a single network device, wherein processor may receive a list of network device connected to the single network device. In one or more embodiments, discovery protocols such as link layer discovery protocols, cisco discovery protocols, simple network management protocols and/or the like may be used to query a first device and request all devices connected to the first device. In one or more embodiments, processor may then be configured to query all devices connected to the first network device in order to determine the most suitable second network device. In one or more embodiments, processor may use discovery request to determine all network devices on a network and all subsequent network devices connected to the first set of network devices and so on until a map is created from a source to a destination. In one or more embodiments, processor may be configured to receive a plurality of network devices wherein multiple sets of network devices connected to one another from a source to a destination may be discovered. In one or more embodiments, congestion datum may be used to identify subsequent network devices connected to a first network device and additional network devices connected to the subsequent devices, thereby forming a path of network devices from a source to a destination. In one or more embodiments, processor may be configured to identify congestion datum for all network devices identified in order to determine routing path.

With continued reference to FIG. 1, in one or more embodiments, modular network interface 136 may be configured to receive transmission data 144 in the form of modulated carrier signal 152 wherein RF control channel device 124 may be configured to demodulate modulated carrier signal 152 and extract transmission data 144. In one or more embodiments, RF control channel device 124 may receive transmission data 144, convert and/or encode transmission data 144 in modulated carrier signal 152 and route modulated carrier signal 152 to modular network interface 136.

With continued reference to FIG. 1, a process of encoding a datum, such transmission data 144 disclosure may include any steps or inverse of steps used to decode transmission data 144 as described in this disclosure. For example, and without limitation, RF control channel device 124 may be configured to encode transmission data 144 wherein RF control channel device 124 may receive transmission data 144, create data packets, create header information and/or the like. In one or more embodiments, a process of encoding transmission data 144 may include converting transmission data 144 from one data protocol to another. In one or more embodiments, a process of encoding transmission data 144 may include modifying transmission data 144 in order to make transmission data 144 suitable for a particular data protocol and/or network device. In one or more embodiments, RF control channel device 124 may encode transmission data 144 by receiving a data file, segmenting the data file into packets and/or preparing data files based on the rules provided by the data protocol. In one or more embodiments, a processing of encoding may include modifying signals to be transmitted, converting signals from analog to digital and/or the like.

With continued reference to FIG. 1, one or more logic circuits may be configured to convert transmission data 144 from an analog format to a digital format and/or from a digital format to an analog format. In one or more embodiments, transmission data 144 may be received by a radio communication and/or an analog device, wherein transmission data 144 may be received in an analog format. In one or more embodiments, one or more logic circuits may be configured to identify a format of transmission data 144 and convert transmission data 144 from an analog format to a digital format and/or a digital format to an analog format. In one or more embodiments, a finite impulse response (FIR) filter and/or an infinite impulse response (IIR) filter may be implemented on RF control channel device 124. In one or more embodiments, An FGPA (not shown) and/or logic circuit may be configured for adaptive filtering wherein adaptive filters such as least mean squares or recursive least square algorithms may be used to for adaptive filter. In one or more embodiments, An FGPA may be configured to noise processing wherein RF control channel device 124 can implement on or more noise reduction algorithms such as wiener filters or Kalman filters to dynamically adjust noise levels within a transmission. In one or more embodiments, An FGPA and/or logic circuit may be configured to perform fast Fourier transform (FFT), and inverse fast Fourier transforms for transmission data 144.

Continuing to refer to FIG. 1, portable ground control station includes at least a display interface output 156 communicatively connected to at least a display 160. In one or more embodiments, the at least a display interface output 156 may be connected to a plurality of display 160s. In one or more embodiments, portable ground control station may include a plurality of display interface outputs 156 wherein each display interface out may be communicatively connected to a separate display 160. In one or more embodiments, portable ground control station 100 may include one or more display interface outputs 156 communicatively connected to a plurality of display 160s. "A display interface output" for the purposes of this disclosure is a digital connection used to communicate audio and/or video between two devices. For example, and without limitation, display interface output 156 may be used to connect a display 160 device to portable ground control station 100. Examples of a display 160 device include, but are not limited to, a liquid crystal display 160 (LCD), a cathode ray tube (CRT), a plasma display 160, a light emitting diode (LED) display 160, and any combinations thereof. In one or more embodiments, display interface output 156 may allow for a communicative connection between display 160 device and portable ground control station 100. In one or more embodiments, display interface output 156 may include port types such as but not limited to, Display 160 Port, VGA, HDMI, DVI, usb-c, thunderbolt and/or the like. In one or more embodiments, display interface output 156 may allow for visualization of information contained within an operating environment and/or virtual environment. In one or more embodiments, display interface output 156 may be used to visualize information received from UAV 128 such as transmission data 144. In one or more embodiments, portable ground control station may include two or more display interface ports wherein a first display interface output 156 configured is to receive a first datum from a first virtual environment and/or operating environment and route the first datum to a first display 160 device and a second display interface output 156 configured to receive a second datum from a second operating environment and/or virtual environment and route the second datum to a second display 160 device. In one or more embodiments, each display interface output 156 may be configured for a separate operating environment, a separate allocation of processor cores and/or the like. In one or more embodiments, each display interface output 156 may be isolated from other display interface outputs 156 wherein a first display interface output 156 may be configured to exclusively display 160 datum from a first program instruction set and a second display interface output 156 may be configured to exclusively display 160 datum from a second instruction set.

With continued reference to FIG. 1, each display interface output 156 may be configured to output visual data received from a differing UAV 128. In one or more embodiments, portable ground control station may be communicatively connected to a plurality of UAV 128s wherein information from each UAV 128 may be output from a differing display interface output 156.

With continued reference to FIG. 1, as used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of the portable ground control station 100. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Communicative connection may include, without limitation, connection via bus.

Further referring to FIG. 1, portable ground control station 100 includes at least a memory, memory may include any machine-readable storage medium. A machine-readable storage medium may include any medium that is capable of storing and/or encoding a sequence of instructions and/or data for execution and/or retrieval by a processor. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

With continued reference to FIG. 1, memory may include a primary memory and a secondary memory. "Primary memory," which may include "random access memory" (RAM), for the purposes of this disclosure is a short-term storage device in which information is processed. In one or more embodiments, during use of computing device, instructions and/or information may be transmitted to primary memory wherein information may be processed. In one or more embodiments, information may only be populated within primary memory while a particular software is running. In one or more embodiments, information within primary memory is wiped and/or removed after computing device has been turned off and/or use of a software has been terminated. In one or more embodiments, primary memory may be referred to as "Volatile memory" wherein the volatile memory only holds information while data is being used and/or processed. Primary memory may include, without limitation, a per-processor primary memory, such as memory included in a SOM with a GPU 104 and/or GPP 108. Per-processor primary memory may be directly connected, and/or connected by bus, only to its assigned processor and/or core; alternatively or additionally, per-processor memory may be connected via a bus to other processors and/or memory elements, and/or selectively connected thereby, such as without limitation by a connection that may be severable from processors and/or cores that are being partitioned away from its assigned processor, for instance and without limitation when the assigned processor and/or core has been assigned to a different virtual environment, operating system, and/or container than another processor from which connection is to be severed. Primary memory may also include one or more components of shared memory, which may, for instance, be equally accessible all cores, and/or one or more components of GPP 108 memory communicatively coupled to and shared by all GPP 108 cores and/or more components of GPU 104 memory communicatively coupled to and shared by all GPU 104 cores, or the like. In one or more embodiments, volatile memory may lose information after a loss of power.

Still referring to FIG. 1, memory may include one or more elements of secondary memory. "Secondary memory," also known as "storage," "hard disk drive" and the like for the purposes of this disclosure is a long-term storage device in which an operating system and other information is stored. Examples of a storage device include, but are not limited to, a hard disk drive, a magnetic disk drive, an optical disc drive in combination with an optical medium, a solid-state memory device, and any combinations thereof. Storage device may be connected to bus by an appropriate interface (not shown). Example interfaces include, but are not limited to, SCSI, advanced technology attachment (ATA), serial ATA, universal serial bus (USB), IEEE 1394 (FIREWIRE), PCIe, and any combinations thereof. Particularly, storage device and an associated machine-readable medium may provide nonvolatile and/or volatile storage of machine-readable instructions, data structures, program modules, and/or other data for portable ground control station. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory may not be directly accessible by GPU 104 and/or GPP 108; for instance, in one or more embodiments, data may be transferred from secondary to primary memory wherein processor may access information from primary memory.

Secondary memory and/or primary memory may include, without limitation, one or more elements of per-processor and/or per-core elements of secondary memory and/or primary memory. For instance, each processor and/or core of GPP 108 and/or GPU 104 may be coupled to a dedicated storage component such as without limitation a flash memory or other solid-state memory component, such as without limitation embedded MultiMediaCard (eMMC) NAND flash memory or the like. As a non-limiting illustration, portable ground control station 100 may include 64 gigabytes (GB) of eMMC 5.1 flash memory per GPP 108, per processor, or the like. Secondary memory may alternatively or additionally include one or more elements of shared secondary memory, which may include secondary memory that is generally available to all processors and/or processor cores of GPP 108 and/or GPU 104s; shared secondary memory may be partitioned for dedication of partitions to specific virtual environments such as containers, virtual machines, or the like, in which case a given partition may be available only to a core or set of cores assigned to its corresponding virtual environment. Shared secondary memory may include without limitation any storage device such as without limitation a hard drive and/or solid state hard derive such as, in a non-limiting illustration, a 1 terabyte (TB), 2 TB, or larger-capacity solid state drive, nonvolatile memory express (NVMe) drive, PCIe M 2 solid state drive, and/or a Federal Information Processing Standard (FIPS)-4 NVMe drive; shared secondary memory may be connected to bus and/or portable ground control station via any suitable connector, including without limitation via a peripheral component interconnect express (PCIe) connector or the like. One or more GPP 108s, GPU 104s, and/or elements of memory may be packaged together in a single module such as without limitation an Nvidia Jetson AGX or the like; multiple such modules may be connected together by elements of bus and/or virtual bus elements to form apparatus.

With continued reference to FIG. 1, Portable ground control station 100 includes one or more memory partitions 164. A "memory partition" for the purposes of this disclosure is a distinct segment or section of a systems' overall memory. For example, and without limitation, a memory may be segmented into multiple memory partitions 164, wherein each memory partition 164 may contain a portion of a total storage space allocated to memory. In one or more embodiments, memory partition 164 may include a distinct portion of memory wherein information contained within one memory partition 164 cannot be accessed by another memory partition 164. In one or more embodiments, memory partitions 164 may serve as virtual isolated memories, wherein each isolated memory may be used by a differing operating environment and/or virtual environment. In one or more embodiments, memory may be partitioned into multiple memory partitions 164 wherein each memory partition 164 may be allocated a predetermined amount of memory. In one or more embodiments, memory partitions 164 may include physically distinct memory, wherein for example a first memory partition may include a first memory, and a second memory partition may include a second memory. In one or more embodiments, memory partitions 164, may be virtually isolated wherein a single memory is segmented into multiple partitions. In one or more embodiments, memory partitions 164 may include a portion of portable ground stations 100 overall memory storage. For example, and without limitation, portable ground station may include 4 memory devices wherein first memory partition may include 2 memory devices. In one or more embodiments, a memory may be split into several partitions wherein each partition may be used for separate and distinct storage tasks. In one or more embodiments, one or more various physical hardware components may be partitioned such as but not limited to a processor, a primary memory, a secondary memory, a network device and the like. In one or more embodiments, partitioning may include the use of disk management software and/or other partitioning software that may allow for the splitting of a physical hardware component into one or more separate partitions. In one or more embodiments, portable ground control station may include more than one memory partitions 164 wherein a separate and distinct operating system and/or virtual environment may operate on each memory partition 164.

With continued reference to FIG. 1, memory partitions, such as for example, first memory partition and second memory partition may be communicatively connected to BUS 116. In one or more embodiments, memory partitions may be communicatively connected to BUS through physical BUS 116 components. In one or more embodiments, memory partitions may not be communicatively connected to BUS 116. In one or more embodiments, memory partitions may be communicatively connected to a virtual BUS and/or one or more virtual components as described in this disclosure. In one or more embodiments, each memory partition 164 may be connected to a virtual Bus, wherein virtual bus includes a virtual representation of BUS 116. In one or more embodiments, memory partitions may include allocated processor cores from either or both GPP 108 and GPU 104. In one or more embodiments, memory partitions 164 may include allocated hardware such as a separate processor, a separate GPU, a separate bus and/or the like. In one or more embodiments, allocated hardware for each memory partition 164 may physically differ and may be isolated from one another. In one or more embodiments, each memory partition may be communicatively connected to an isolated processor core and/or isolated hardware components and contain instructions to configure the isolated processor cores and/or isolated hardware components to perform one or more tasks. In one or more embodiments, a plurality of memory partitions may exist wherein each memory partition may include an isolated processor core and/or isolated hardware components. In one or more embodiments, three memory partitions may exist wherein each memory partition may include an isolated hardware component and/or processor core configured to perform one or more tasks as described in this disclosure. In one or more embodiments, each memory partition 164 may contain instructions to generate an operating environment for each UAV.

With continued reference to FIG. 1, each memory partition 164 and/or operating environment located on each memory partition 164 may include a partition policy. A "partition policy," for the purpose of this disclosure, is rules, constraints, and configurations for how a partition (or a virtual machine/container) within a virtual environment accesses resources. In some cases, at least a partition policy may specify how much CPU, memory, storage, network bandwidth and/or the like a partition in question can utilize. In some cases, at least a partition policy may also determine the scheduling policy for a partition, for example, the partition's priority, operating time, or whether it is preemptible. In an embodiment, at least a partition policy may define a level of separation between plurality of partitions to ensure that one partition's operation does not adversely impact another's. In such embodiment, this may prevent failures from propagating. In some cases, partition policy may also outline what resources e.g., I/O devices, data files, network interfaces, and/or the like partition may be able to access. In some cases, partition policy may include a level of access (e.g., read, write, execute, and the like). In a non-limiting example, in an aviation system, at least a partition policy may be configured to ensure that a partition handling flight control logic gets a highest priority and is isolated from partitions handling non-critical tasks e.g., in-flight entertainment. In another non-limiting example, partition policies may balance computing resources allocation for achieving a desired system performance e.g., desired energy efficiency, ensuring that each virtual machine only the resources it needs.

Still referring to FIG. 1, in one or more embodiments, portable ground control station 100 may be configured to initiate a secure boot process when portable ground control station and/or a portable ground control station is powered on or restarted. In some cases, portable ground control station may include a secure computing module, which may be called and/or activated by trusted bootloader. A "trusted platform module," for the purpose of this disclosure, is a specialized chip on an endpoint hardware component (i.e., device) that store keys e.g., cryptographic keys such as encryption keys, decryption keys, public keys, private keys, or any key as described herein. In a non-limiting example, portable ground control station may include a plurality of secure computing modules, each containing an RSA key pair known as "Endorsement key (EK)," wherein the RSA key pair may be maintained inside of a secure computing module and cannot be accessed by non-secure software. In some cases, a first partition may include a bootloader (i.e., the first piece of software that runs). In some cases, bootloader may be verified, for example, one or more portable ground control station firmware may be configured to check bootloader's digital signature before execution using keys e.g., public keys stored in secure computing module or another secure component. In case where bootloader's signature doesn't match, portable ground control station may halt, preventing potential malicious partitions from running. Once bootloader is verified and executed, a hypervisor may be instantiated. In some cases, a hypervisor may also be verified through an associated digital signature to ensure its authenticity. In a non-limiting example, portable ground control station may boot only with trusted and authenticated partitions e.g., a primary partition and plurality of child partitions. Child partitions may be verified before loading, or trusted version of second partition may be loaded. Hypervisor may be configured to prevent any child partition that yield a negative response during verification. In some cases, all events during the secure boot process as described herein, including, without limitation, any verification failures or anomalies, can be communicated to primary partition through virtual bus. In some cases, these events may be alerted to certain users e.g., administrators. Additionally, or alternatively, in cases where verification fails, portable ground control station may be configured to boot into a safe mode, attempting to restore a trusted software version, or simply halting a processor and/or primary partition to prevent potential threats. Attested boot may include, without limitation cryptographically hashing one or more of hypervisor, inputs thereto, and/or outputs thereof, which may be digitally signed using secure computing module; such a cryptographic hash, known as a "measurement" for the purpose of this disclosure, may be stored in storage and/or secondary memory. Similarly, hypervisor may hash and/or sign operating systems, containers, and/or programs executing thereon and store such measurements in secondary memory; hypervisor may sign using secure computing module or any other private key and/or secret associated with hypervisor.

In an embodiment, and still referring to FIG. 1, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

Further referring to FIG. 1, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In one or more embodiments, and still referring to FIG. 1, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, and continuing to refer to FIG. 1, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of 2256 operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Still referring to FIG. 1, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, and with further reference to FIG. 1, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Continuing to refer to FIG. 1, zero-knowledge proof may include any other suitable zero-knowledge proof. Zero-knowledge proof may include, without limitation, bullet-proofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, and with further reference to FIG. 1, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Still referring to FIG. 1, keys may be generated by random variation in selection of prime numbers, for instance for the purposes of a cryptographic system such as secret that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem. Cryptographic system may be configured to generate a session-specific secret. Session-specific secret may include a secret, which may be generated according to any process as described above, that uniquely identifies a particular instance of an attested boot and/or loading of software monitor. Session-specific secret may include without limitation a random number. Session-specific secret may be converted to and/or added to a secure proof, verification datum, and/or key according to any process as described above for generation of a secure proof, verification datum, and/or key from a secret or "seed"; session-specific secret, a key produced therewith, verification datum produced therewith, and/or a secure proof produced therewith may be combined with module-specific secret, a key produced therewith, a verification datum produced therewith, and/or a secure proof produced therewith, such that, for instance, a software monitor and/or other signed element of attested boot and/or attested computing may include secure proof both of session-specific secret and of module-specific secret. In an embodiment, session-specific secret may be usable to identify that a given computation has been performed during a particular attested session, just as device-specific secret may be used to demonstrate that a particular computation has been produced by a particular device. This may be used, e.g., where secure computing module and/or any component thereof is stateless, such as where any such element has no memory that may be overwritten and/or corrupted.

Continuing to refer to FIG. 1, a "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still viewing FIG. 1, in one or more embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in one or more embodiments contains data conveying the certificate authority's authorization for the recipient to perform a task. The authorization may be the authorization to access a given datum. The authorization may be the authorization to access a given process. In one or more embodiments, the certificate may identify the certificate authority. The digital certificate may include a digital signature.

With continued reference to FIG. 1, in one or more embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

With continued reference to FIG. 1, memory and/or memory partition 164 may include instructions configuring the at least a core to verify a compliance of the portable ground control station 100 with at least a pre-determined safety standard from a trusted repository by monitoring an adherence of the portable ground control station 100 to the pre-defined operational rule. As a non-limiting example, portable ground control station may implement one or more aspects of Future Airborne Computing Environment (FACE™). As used in this disclosure, a "Future Airborne Computing Environment" is a technical standard and business strategy for promoting acquisition of open systems software architecture in aviation industry, specifically for military avionics system. In some cases, portable ground control station may employ FACE approach, wherein at least processor core may run in a common operating environment to support one or more portable capability software applications across a plurality of department of defense (DoD) avionics systems. In some cases, FACE may include a plurality of software application programming interfaces (APIs) grouped into "segments." In a non-limiting example, FACE may include operating system segments (OSS), platform specific services segment (PSSS), I/O service segment, transport services segment, and/or the like. In some cases, FACE may provide a bounding box around software items and APIs, i.e., FACE Boundary. In some cases, portable ground control station may include one or more extensions to FACE that satisfy safety assumptions in hardware outside FACE Boundary. In a non-limiting example, FACE may include a plurality of API groups (i.e., segments), wherein one or more API groups may be dependencies for avionics functional software (i.e., portable component segment [PCS]) to be deployed to FACE. In some cases, such avionics functional software may not need any dependencies. Additionally, or alternatively, FACE may also anticipate one or more hardware resources which software (i.e., portable component segment deployed within the FACE Boundary) may or may not require to satisfy their hardware assumptions and/or dependencies. In a non-limiting example, FACE may include a health monitoring monitor, interface hardware such as Ethernet device driver (within operating system segment) configured to infer specific hardware assumptions.

With continued reference to FIG. 1, and as a further non-limiting example, in one or more embodiments, portable ground control station may implement one or more aspects of Open Mission Systems (OMS). As used in this disclosure, an "open mission system" is a (government-owned) specification for creating an open and interoperable system architecture for military avionics and mission systems. In some cases, OMS initiative may be focused on standardizing interfaces of systems components to promote modularity and system upgrades with minimal impact on existing system components. In one or more embodiment, OMS and FACE may include implementation of one or more modular open system approaches, wherein the "modular open system approach (MOSA)" is a strategy and methodology for system design that encourages the use of modular, interoperable components that follows open standards. It should be noted that while MOSA is used intensively in military and aerospace applications, it may also be applicable to any complex system that requires flexibility, scalability, and upgradeability over time. In a non-limiting example, OMS may apply one or more MOSA principles to create a standardized approach to mission system architecture in military aviation, wherein the MOSA principles may define one or more open interfaces for systems as described herein e.g., sensors, weapons, communications, propulsion, and/or the like. This may include, without limitation, a unified system that integrates a plurality of platforms and hardware components, in some cases, sensors for real-time data sharing and decision-making regarding one or more on-going missions. In one or more embodiments, portable ground control station may implement one or more aspects of the Modular Open Systems. Any or all of the above standards may be applied with Kubernetes orchestration. Portable ground control station may be configured to perform according to one or more other standards, such as Airworthiness and Security Accreditation CATO, military messaging standards such as Link 16, Cursor-on-Target, or the like.

Continuing to refer to FIG. 1, portable ground control station 100 may operate as a computing device having one or more synchronous elements and/or clocks and may be designed and/or configured to perform any method, method step, or sequence of method steps in any embodiment described in this disclosure, in any order and with any degree of repetition; for instance, memory may configure processors to perform methods, method steps, and/or sequences of method steps. For instance, portable ground control station 100 and/or components thereof may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Portable ground control station 100 and/or components thereof may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, memory partition 164 may be communicatively connected to at least a first core of the first plurality of processor cores 106a-e of GPU 104 and a first core of the second plurality of processor cores 110a-e of CPU. In one or more embodiments, the memory partition 164 contains instructions configuring the processor cores to generate a first operating environment. An "operating environment" for the purposes of this disclosure refers to the combination of hardware and software that allows a computer software to function or execute. For example, and without limitation, operating environment may include an operating system, device drivers, virtual machines, software containers, software modules 138, executable programs and the like. In one or more embodiments, operating environment may allow for the execution of computer software. In one or more embodiments, operating environments may allow for the execution of software modules 138 and/or software containers. software container may include a container image. A "software image," also known as a "container image," as described herein, is a snapshot or a packaged representation of an entire software state, including executable code, configurations, dependencies/libraries, and other required data. In some cases, software image may include source code, libraries, and other software components that the software relies on. In some cases, software image may include one or more configuration files which define a plurality of settings, parameters, and other configurations for the software. In some cases, configuration files may include certain OS configurations, environmental variables, or other system-level settings. In a non-limiting example software image may include a portable executable image combined with a manifest file that is used by a container manager as described below to deploy the software image on an operating environment with appropriate data services and restrictions. In some cases, software image may be used to package a software application with its entire collection of dependencies, ensuring that the software application can run consistently across different SOEs. Exemplary software applications may include, without limitation, flight management system (FMS) software, air traffic control (ATC) software, avionics systems, electronic flight bag (EFB) software, ground support equipment software, weather forecasting and reporting software, cockpit display 160 rendering software, and/or the like. In some cases, software image may include a virtual machine image that encapsulate a whole operating system along with one or more pre-installed software applications. Such software may be easily replicated across a plurality of host circuits e.g., servers or cloud environment. In other cases, software image may be used as a backup snapshot to restore/roll back system or a software application to a known working state. A "software module" for the purposes of this disclosure, is an application or software that is sought to be executed. For example, and without limitation, software module 138 may include a web browser, word processing software, a media player, a digital calculator, flight systems software, military software and the like. In one or more embodiments, software module 138 may include an application that is sought to be executed within software container. In one or more embodiments, any data and/or information within software container may be used to ensure proper execution of software module 138. In one or more embodiments, software container may contain libraries, dependencies, and the like to ensure proper execution of software module 138. In one or more embodiments, software module 138 may include an executable file. In one or more embodiments, software module 138 may include third party application wherein 3rd party applications may include software and/or application created and/or managed by a differing entity. In one or more embodiments, software module 138 may include previously developed applications wherein the previously developed application are modified to interact with a particular environment. In one or more embodiments, software container may allow for a third-party application and/or previously developed application to be deployed within multiple virtual environments and/or operating system. In one or more embodiments, software module 138 may include a previously developed application and/or $3^{rd}$ party application wherein software module 138 may be placed within software container to allow for software module 138 to operate within multiple environments. A "software container" for the purposes of this disclosure is an executable package that is capable of running software within an isolated space. For example, and without limitation, software container may include a document drafting software wherein the software container may contain any information, runtime environment and the like necessary to execute the document drafting software on more than one operating systems. In one or more embodiments, software containers may create a virtualized environment wherein a software may run within the virtualized environment. In one or more embodiments, operating environment may include a virtualized environment. A "virtualized environment," for the purposes of this disclosure is a system in which software may be isolated while still operating on a host operating system. For example, and without limitation, software container may operate in a virtualized environment wherein a software within software container may not communicate with the host operating system. In one or more embodiments, software container may allow for OS virtualization wherein a software may be isolated from a host operating system while still sharing the host operating system kernel. An "Operating system (OS) level virtualization," for the purposes of this discourse is a system in which an operating system kernel allows the existence of multiple isolated environment. In OS virtualization, a software within software container may not have access to resources of the host operating system. Instead, the software may only have access to the contents within software container. In one or more embodiments, operating environment may include a host operating system. A "host operating system" for the purposes of this disclosure is a primary operating system running on processor. In one or more embodiments, software container may be executed atop host operating system. In one or more embodiments, virtual operating systems may exist atop host operating system. In one or more embodiments, host operating system may include an operating system configured to allow instantiation of one or more software containers, one or more virtual machines and the like. In one or more embodiments, software container may communicate with host operating system to receive resources from processor and/or memory. In one or more embodiments, an ordinary software operating outside of a software container may have access to various operating system resources such as but not limited to, processing capabilities, file systems, networks and the like. In contrast, a software operating within a software container may only have access to the contents within the software container. This may include various files, network capabilities and the like. In one or more embodiments, a software within software container may communicate with software container wherein software container may transmit the commands to the processor. In one or more embodiments, software container may contain application-level virtualization. "Application-level virtualization" for the purposes of this disclosure is a system in which a software may be completely encapsulated from a host operating system such that the software may not share the host operating system kernel. In one or more embodiments, in application-level virtualization an application may be encapsulated within a virtual environment as described in further detail below. In one or more embodiments, in application-level virtualization an application may communicate through a virtualization layer such as one created by a hypervisor. In one or more embodiments, application virtualization may include a process in which the application does not rely on the host operating system kernel. In one or more embodiments, software container may contain OS level virtualization wherein a software within software container may be executed in a virtualized environment. In one or more embodiments, software container may contain application virtualization wherein a software may be executed on multiple differing operating system. In one or more embodiments, in an OS level virtualization, a software may be dependent on the host operating system kernel wherein in an application virtualization, the software may run independent of the host operating system kernel. In one or more embodiments, software container may isolate an application from a surrounding environment wherein the software may operate in a runtime environment. In one or more embodiments, the runtime environment includes everything necessary to allow for isolation of a software from the host operating system. This may include but is not limited to application and/or software code, dependencies, runtime components needed to execute the application such as access to a database, and the like. In one or more embodiments, a software within software container may operate in a runtime environment wherein the software may be isolated from the host operating system. In one or more embodiments, software container may allow for an application to be executed and/or deployed on multiple operating systems. In one or more embodiments, software container may contain libraries, configuration files, binary code and/or any other information that is necessary to execute the application and/or software. In one or more embodiments, a software container may contain some degree of independence from the operating system and/or host system wherein the software container does not rely on the operating system for any information needed to properly deploy an application within software container. In one or more embodiments, operating systems may lack the proper functionalities to execute an application, wherein software container may be used to ensure that any necessary functionalities, information, and the like are self-contained. In one or more embodiments, software container may contain a container image, wherein the container image is a portable executable image combined with a manifest that is used by a container manager to deploy the container image on an operating environment with appropriate data services and restrictions. In one or more embodiments, software container may contain restrictions and/or instructions on how a software may communicate with the operating system in which it is deployed on. In one or more embodiments, software container may contain a container manager, wherein the container manager has the ability to deploy container images on the operating system. The container manager may interface with container image repositories, validate the authenticity of container images, load container executables into container environments, connect container environments to operating service, and exports management application user interfaces (API) to system management tools.

With continued reference to FIG. 1, first operating environment may be located on a first memory partition 164 and operate on first core of first plurality of processor cores 106a-e. In one or embodiments, portable ground control station may include a second memory partition 164 communicatively connected to at least a second core of the first plurality of processor cores 106a-e of GPU 104 and a second core of second plurality of processor cores 110a-e of GPP 108. In one or more embodiments, the second memory partition 164 may contain instructions configuring the at least a second core to generate a second operating environment on the at least a second core. In one or more embodiments, a separate and differing operating environment may be simultaneously instantiated on two differing processor cores. In one or more embodiments, first memory partition 164 may include first operating environment, and second memory partition 164 may include second operating environment. In one or more embodiments, each operating environment may be configured to communicate with a differing UAV 128. In one or more embodiments, each operating environment may be configured to utilize differing data protocols and/or to communicate with differing systems.

With continued reference to FIG. 1, RF control channel device 124 may communicate with operating environments through a hypervisor. A "hypervisor" for the purposes of this disclosure is a software module 138 which is configured to create and manage virtual machines. In one or more embodiments, hypervisor may create one or more virtual machines wherein each virtual machine may host a seperate and isolated operating environment. In one or more embodiments, each virtual environment may contain a separate and isolated operating system. In one or more embodiments, a hypervisor may run on the host operating system wherein the hypervisor may generate virtual machines on the host operating system. In one or more embodiments, a hypervisor may run directly on the hardware of a computing device without reliance on an operating system. In one or more embodiments, a hypervisor hat runs independent of a host operating system may be referred to as a "Type 1" and/or "bare metal" Hypervisor. In one or more embodiments, in a bare metal hypervisor, the hypervisor is directly installed on the hardware of computing device of portable ground control station 100 rather than through the operating system. In one or more embodiments, a type 1 hypervisor may partition resources, such as memory processing power and the like for each virtual machine. In one or more embodiments, virtual machines may communicate directly with the hardware of portable ground control station 100 rather than the host operating system. In one or more embodiments, in a bare metal hypervisor virtual machines are not susceptible to issues caused by the host operating system and/or other virtual machines. In one or more embodiments, virtual machines may be isolated and unaware that other virtual machines exist. In one or more embodiments, a bare metal hypervisor may allow for increased performance wherein virtual machines may communicate directly with hardware rather than through the intermediate host operating system. In one or more embodiments, a bare metal hypervisor may allow multiple virtual machine to run simulates wherein failure of one virtual machine may not result in a failure of a second virtual machine. In one or more embodiments, in a type 2 hypervisor, partitioning and resource allocation may occur above the host operating system layer, whereas in a type 1 hypervisor partitioning may occur below the host operating system and directly with the hardware of computing device. In one or more embodiments, in a type 2 hypervisor, virtual environments or operating environments may rely on the host operating system for proper resource allocation and memory allocation whereas in a type 1 hypervisor, virtual environments may only rely on the hardware.

With continued reference to FIG. 1, a virtualization layer may be supervised by hypervisor, wherein a host operating system within virtual environment is operated by the virtualization layer. As used in this disclosure, a "virtualization layer" is a software layer (or interface) that sits between hardware layer (e.g., physical CPU, memory, I/O devices, and/or the like) and virtual environment having one or more virtual machines. In some cases, virtualization layer may be configured to virtualize the underlaying hardware resources and present the virtualized hardware resources to plurality of virtual machines as though they are dedicated to each virtual machine. In a non-limiting example, a plurality of partitions of a single physical hardware component as described herein may share the same physical hardware resources through virtualization layer, without being aware of each other. In some cases, virtualization layer may be instantiated when hypervisor is booted or launched. In a non-limiting example, in case of a type 1 hypervisor, virtualization layer may be generated when machine starts up since hypervisor directly interface with hardware. In some cases, virtualized resources may be allocated based on partition policy as described in detail below. In some cases, hypervisor may manage the scheduling of virtual machines tasks on actual cores. In some cases, hypervisor may handle interruptions, exceptions, and any events that occur, deciding which virtual machines or service needs attention. In some cases, hypervisor may be configured to isolate one or more virtual machines from rest of virtual machines to maintain system security and stability. In other cases, hypervisor may be configured to manage lifecycle operations of one or more virtual machines such as, without limitation, creation, modification, deletion, migration, and/or the like. Virtual machines and/or hypervisors may be implemented, without limitation, as described in U.S. Nonprovisional application Ser. No. 18/395,149, filed on Dec. 22, 2023, the entirety of which is incorporated herein by reference, and/or as described in U.S. Nonprovisional application Ser. No. 18/395,210, filed on Dec. 22, 2023, the entirety of which is incorporated herein by reference.

With continued reference to FIG. 1, in a non-limiting example, when a first partition is created, a pre-defined set of virtual hardware resources may be provided by virtualization layer, wherein the pre-defined set of virtual hardware resources may include, but is not limited to processor cores, portion of virtualized memory, virtual disks, virtual network interfaces, RF control channel devices, among others. As first partition attempts to execute one or more operations or access its "hardware," first partition may actually interface with virtualization layer, for instance, and without limitation, when A virtual machine (VM) tries to use at least a processor, it may be scheduled by hypervisor onto physical processor on hosting circuit through virtualization layer. In some cases, first partition may perceive resources as if they are dedicated hardware components, oblivious to the abstraction layer beneath. In some cases, virtualization layer may handle I/O operations, translating virtual disk or network accesses to actual operations on the physical hardware. Any interruption, exception, or system call made by first partition may be intercepted by virtualization layer which then communicates with hypervisor to handle or service that request.

With continued reference to FIG. 1, portable ground control station 100 may include a first hardware allocation 160. In one or more embodiments, first hardware allocation 160 may include allocated hardware such as, but not limited to, allocated memory, allocated processor cores, a GPU allocated specifically for first hardware allocation, a CPU allocated specifically for first hardware allocation and/or the like. In one or more embodiments, first hardware allocation may include dedicated processor cores from first plurality of processor cores 106a-e and dedicated processor cores from second plurality of processor cores 110a-e. In one or more embodiments, processor cores may be dedicated to first hardware allocation, wherein dedicated cores may only be used for operating environments associated with first hardware allocation. For example, and without limitation, processor cores 106a-b of second plurality of processor cores 160a-e may be dedicated specifically to first hardware allocation 160. In another non limiting example, processor cores 110a-b of second plurality of processor cores 110a-e may be dedicated exclusively to first hardware allocation. In one or more embodiments, first hardware allocation may include segments of a single physical hardware components. In one or more embodiments, first hardware allocation may include entire physical hardware components (e.g. memory, processor, GPU etc.) that are dedicated exclusively to first hardware allocation. In one or more embodiments, portable ground station 100 may include a second hardware allocation 164. In one or more embodiments, second hardware allocation 164 may be consistent with first hardware allocation 160. In one or more embodiments, first hardware allocation 160 and second hardware allocation 164 (herein after referred to as "hardware allocations") may be used to isolate operating environments 136. In one or more embodiments, hardware allocations may be used to isolate resources for each operating environment 136. In one or more embodiments, hardware allocations may be created using a hypervisor, an instruction set configuring the hypervisor to create hardware allocations and/or in any way as described in this disclosure. In one or more embodiments, each memory partition may be located on separate hardware allocations and contain instructions to generate operating environments using the hardware allocations.

With continued reference to FIG. 1, in some cases, hypervisor may include single root input output virtualization (SR-IOV). "Single root input output virtualization" for the purposes of this disclosure is a software capability in which single Peripheral component interconnect express (PCIe) devices may be virtualized into multiple virtual devices. For example, and without limitation, a network adapter may be virtualized wherein multiple virtual adapters may exist. In one or more embodiments, SR-IOV may include the virtualization of physical components such as but not limited to, a GPU 104, network adapter, storage controllers, FPGA devices, audio processing cards, solid state drives and the like. In one or more embodiments, SR-IOV may allow for partitions to access a single physical device. In one or more embodiments, first partition may have direct access to a physical device without an operating system allocating resources. In one or more embodiments, SR-IOV may allow for the sharing of resources, such as for example network adapters, while still maintaining independence. In one or more embodiments, SR-IOV may allow for multiple VMs operating on a hypervisor e.g., type 1 hypervisor to have access to physical devices without an intermediary such as a shot operating system. In one or more embodiments, host circuit may contain physical hardware that is capable of virtualization. In one or more embodiments, hypervisor may contain the proper systems and/or software to enable SR-IOV wherein VM may receive a virtual component. In one or more embodiments, SR-IOV may allow for one or more separate virtual environments with direct access to one or more physical hardware components of hosting circuit.

Further referring to FIG. 1, hypervisor may be configured to execute at least a container or an operating environment. Hypervisor may be configured to execute at least an operating system. Operating system may include any suitable operating system, including without limitation Linux, Unix, BEOS, Windows, or any other operating system that may occur to a person skilled in the art upon reviewing the entirety of this disclosure. For instance, and without limitation, operating system may include an Ubuntu 20.04 LTS with JetPack 4.6.

With continued reference to FIG. 1, hypervisor and/or portable ground control station 100 is configured to generate an operating environment. Operating environment may include any operating environment and/or virtual environment as described in this disclosure. In one or more embodiments, portable ground control station may be configured to generate an operating environment for each virtual machine of one or more virtual machines. In one or more embodiment, each operating environment may include a differing operating system wherein a first operating environment may contain a differing operating system as a second operating environments. In one or more embodiments, portable ground control station 100 may be configured to generate a separate operating environment within each virtual machine. In one or more embodiments, portable ground control station 100 may be configured to deploy software container (as described in further detail below). In one or more embodiments, software container may be transferred to operating environment using host operating system. In one or more embodiments, host operating system may contain virtual remote, an SSH shell and the like wherein software container 1 may be transmitted to operating environment. In one or more embodiments, host operating system may be configured to create operating environments, virtual machine, virtual script and/or virtual package wherein host operating system may transfer operating environments, virtual machine, virtual script and/or virtual package to one or more partitions. In one or more embodiments, portable ground control station 100 may contain one or more storage devices wherein each storage device may contain virtual machine, operating environment, and the like. In one or more embodiments, portable ground control station 100 may be configured to allocate storage space and/or memory through the creation of partitions as described in further detail below.

With continued reference to FIG. 1, operating environment may be communicatively connected to RF control channel device 124, modular network interface 136 and/or other components of portable ground control station 100 through a virtual binary unit system 116 (BUS). Virtual Bus is described in further detail below.

Still referring to FIG. 1, in some embodiments, multiple processor cores may be allocated to implement a single operating environment. In some embodiments, GPU 104 cores and CPU cores may both be used to implement a single operating environment. This may be enabled, for example, by an API described herein. In a non-limiting example, a GPU 104 may include a first plurality of processor cores 106a-e, a CPU may include a second plurality of processor cores 110a-e, portable ground control station may receive a program instruction set, and portable ground control station may allocate a first core from the first plurality of processor cores 106a-e and a second core from the second plurality of processor cores 110a-e to the program instruction set, wherein the instruction set contains instructions configuring processor to generate operating environment. In some embodiments, such an operating environment may be stored in local memory. In some embodiments, such an operating environment may be received from an external device. In some embodiments, portable ground control station may be partitioned such that such operating environment operates on a separate partition from other programs. In some embodiments, portable ground control station 100 may run a virtual environment and/or operating system on a set of cores and memory partitions 164 allocated to operating environment. In some embodiments, cores and/or memory allocated to operating environment may be connected selectively through an FGPA or virtual Bus. This may prevent, for example, access of memory allocated to program instruction set 136 by a nonsecure program.

With continued reference to FIG. 1, portable ground control station may be configured to receive a program instruction set and allocate processor cores from the CPU and GPU 104 for the first program instruction set. In one or more embodiments, the first program instruction set may include an operating environment, a virtual machine, and/or the like as described in this disclosure. In one or more embodiments, generating operating environments may include receiving program instruction sets containing instructions to generate operating environments. In one or more embodiments, a program instruction set may be used to generate each operating environment. In one or more embodiments, first program instruction set may include instructions configuring the CPU to allocate processor cores from CPU and GPU 104 for implantation of an operating environment. In one or more embodiments, portable ground control station may be configured to receive a first program instruction set and allocate a first processor core from a first plurality of processor cores 106a-e and a second processor core from the second plurality of processor cores 110a-e to the first program instruction set. In one or more embodiments, the first plurality of processor cores 106a-e may include processor cores associated with GPU 104. In one or more embodiments, second plurality of processor cores 110a-e may include processor cores associated with GPP 108. In one or more embodiments, portable ground control station may be configured to receive an additional and/or second program instruction set and allocate a third processor core from the first plurality of processor cores 106a-e and a fourth processor core from the second plurality of processor cores 110a-e to the second program instruction set. In one or more embodiments, the second program instruction set may be configured to generate a second operating environment. In one or more embodiments, portable ground control station may be configured to receive a plurality of program instruction sets and allocate processor cores from GPP 108 and GPU 104 for each program instruction set.

With continued reference to FIG. 1, program instruction sets may include virtual environments, virtual machines, operating environments, and/or the like. In one or more embodiments, RF control channel device 124 may be configured to transmit transmission data 144 to each instruction set and/or to the allocated processor cores of each instruction set. In an embodiment, RF control channel device 124 may be configured to route transmission data 144 from operating environments and/or program instructions to network devices such as modular network interface 136.

With continued reference to FIG. 1, operating environment may communicate with RF control channel device 124 through the use of a virtual bus, a virtual network interface, through direction communication with processor cores to FPGA and/or RF control channel device 124 and/or the like.

With continued reference to FIG. 1, RF control channel device 124 may receive transmission data 144 from operating environment through virtual network interface, virtual switches, virtual Bus systems and/or the like. Additionally or alternatively RF control channel device 124 may be configured to route transmission data 144 to operating environment through virtual Bus, virtual network interface, hypervisor and/or the like. In one or more embodiments, RF control channel device 124 may be configured to route transmission data 144 to multiple operating environments.

With continued reference to FIG. 1, memory partition 164 includes instructions configuring the at least a core to transmit, using a software module 138 operating in operating environment, at least a flight command 148 to UAV 128 using a selected RF control channel 120. In one or more embodiments, software module 138 may select a particular RF control channel 120 based on the UAV 128 in which an individual may want to communicate with. In one or more embodiments, flight command 148 may be routed from operating environment and to RF control channel device 124. In one or more embodiments, RF control channel device 124 may be configured to encode and/or modulate transmission data 144, wherein transmission data 144 may be transmitted to UAV 128 through modular network interface 136. In one or more embodiments, based on selected RF control channels 120, one or more logic circuits may be configured to modulate and/or encode transmission data 144 based on the select RF control channel 120 selected by software module 138. In one or more embodiments, software module 138 and/or operating environment may communicate transmission with a virtual network interface wherein RF control channel device 124 is configured to receive transmission data 144 and route transmission data 144 through modular network interface 136 and through communication network. In one or more embodiments, software module may transmit flight commands 148 from portable ground control station 100 to UAV 128 through operating environment and through RF control channel device 124.

With continued reference to FIG. 1, at least a core may select RF control channels 120 based on selections made by software module 138, based on information contained within header information of transmission data 144 and/or the like.

With continued reference to FIG. 1, software module 138 may encrypt at least a flight command 148 and/or transmission data 144 using one or more encryption processes as described above. In one or more embodiments, UAV 128 may be configured to receive inly encrypted flights commands. In one or more embodiments, transmission data 144 may be encrypted, converted into modulated carrier signal 152 and received by UAV 128. In one or more embodiments, UAV 128 may be configured to demodulate transmission data 144, unencrypt transmission data 144 and process at least a flight command 148. In one or more embodiments, flight command 148 may be transmitted to FPGA, wherein flight command 148 may be modulated and prepared for transmission. In one or more embodiments, FPGA may route flight command 148 through modular network interface 136.

With continued reference to FIG. 1, software module 138 and/or operating environment is configured to receive transmission data 144 from UAV 128. In one or more embodiments, transmission data 144 may be received as a function of the transmitted flight command 148. In one or more embodiments, transmission data 144 may be received from UAV 128 absent a flight command 148. In one or more embodiments, modular network interface 136 may receive transmission data 144 in the form of modulated carrier signal 152. In one or more embodiments, RF control channel device 124 may be configured to demodulate modulated carrier signal 152 and extract transmission data 144. In one or more embodiments, RF control channel device 124 may then be configured to route transmission data 144 to operating environment. In one or more embodiments, operating environment may contain unique identifiers and/or addresses wherein RF control channel devices 124 may be configured to route transmission data 144 based on the particular identifier or addresses within transmission data 144. IN one or more embodiments, each operating environment may operate using a differing data protocol wherein RF control channel device 124 may identify the data protocol of modulated carrier signal 152 and route transmission data 144 to the appropriate operating environment. In one or more embodiments, operating environment and/or software module 138 may receive transmission data 144. In one or more embodiments, operating environment may decrypt transmission data 144.

With continued reference to FIG. 1, portable ground control station may be configured to receive transmission data 144 from UAV 128 and transmit or route transmission data 144 to terrestrial device 140. In one or more embodiments, UAV 128 may seek to communicate with a terrestrial device 140 but may not have the capabilities to do so. In one or more embodiments, portable ground control station may serve as a participating node within a network and communicate transmission data 144 to terrestrial device 140. In one or more embodiments, portable ground control station 100 may receive transmission data 144 in a first data protocol, convert transmission data 144 from the first data protocol to a second and differing data protocol and route transmission data 144 through a network device suitable for communication with terrestrial device 140. With continued reference to FIG. 1, at least a first core is configured to receive transmission data 144 and route transmission data 144 to terrestrial device 140. In one or more embodiments, portable ground control station 100 may serve as a participating node, wherein communication from UAV 128 may be transmitted through portable ground control station and to terrestrial device 140. A "participating node" for the purposes of this disclosure refers to a device, such as a network device as described above, that participates in the communication process between two systems or networks. In one or more embodiments, participating nodes may be responsible for the transmission of transmission data 144. In one or more embodiments, participating nodes may include networks, devices, network devices and/or remote devices that can receive, store and transmit transmission data 144. In one or more embodiments, virtual environments may be located on a device with sporadic and/or intermittent network connections wherein transmission data 144 may be transmitted across participating nodes until they arrive at their final destination. In one or more embodiments, the source node may include the source of the transmission of transmission data 144. In one or more embodiments, the source node may include the first participating node in a sequence of nodes and/or the initial location of transmission data 144. For example and without limitation, source node may include UAV 128. In one or more embodiments, the destination node includes the final destination of transmission data 144, such as for example, terrestrial device 140. In one or more embodiments, the destination node may include the last participating node in a sequence of nodes and/or the final destination of transmission data 144. In one or more embodiments, a network controller may be configured to determine or identify a routing path for transmission data 144 wherein portable ground control station 100 may receive transmission data 144 and route transmission data 144 to the next participating node. In one or more embodiments, portable ground control station may serve as a single participating node with a plurality of participating nodes from a source to a destination. In one or more embodiments, portable ground control station 100 may be configured to receive transmission data 144 and transmit transmission data 144 to the next participating node with a network. In one or more embodiments, portable ground control station 100 serves as participating node between UAV 128 and terrestrial device 140.

With continued reference to FIG. 1, RF control channel device 124 may be configured to convert transmission data 144 from one data protocol to another. In one or more embodiments, modular network interface 136 may receive transmission data 144 through a first network device, wherein operating environment and/or RF control channel device 124 may convert transmission data 144 from one data protocol to another. In one or more embodiments, RF control channel device 124 may then communicate transmission data 144 to terrestrial device 140 through a second network device of modular network interface 136.

With continued reference to FIG. 1, at least a core is configured to output transmission data 144 on display 160. In one or more embodiments, transmission data 144 may be output through display interface port. In one or more embodiments, transmission data 144 may be display 160ed on display 160 through display interface port. In one or more embodiments, transmission data 144 may be display 160ed on one or more display 160s. In one or more embodiments, portable ground control station may be configured to receive more than one transmission data 144 wherein each transmission data 144 is associated with a differing UAV 128 and/or operating environment. In one or more embodiments, each core may be configured to display 160 transmission data 144 associated with their respective operating environment and/or UAV 128 on a separate display 160.

With continued reference to FIG. 1, software module 138 may include a user interface configured to receive transmission data 144. In one or more embodiments, transmission data 144 may be routed to software module 138 wherein software module 138 may modify a user interface in order to visualize transmission data 144 received from UAV 128.

Referring now to FIG. 2, a block diagram of an exemplary embodiment of an edge computer 200 is described. An "Edge computer" as described in this disclosure refers to a computing device that processes data near the source of generation rather than relying on a central processor. For example, and without limitation, edge computer may be configured to receive network communication and process the network communications without the need for a central operating system or processor. In one or more embodiments, edge computer 200 may allow for processing of data prior to receipt by a central operating system. In one or more embodiment, edge computer 200 may allow for the processing of data directly from sensors, IoT devices, communication from network device and/or the like. In one or more embodiments, use of an edge computer may reduce latency wherein data can be transmitted directly to a processing unit for analyzation. In one or more embodiments, edge compute may be used to process signals, send and receive communications, processor communications, support network virtualization and/or the like. In one or more embodiments, an edge computer may serve as a network controller (as described in reference to FIG. 2). In one or more embodiments, edge computer 200 may be configured to handle data protocols, convert data unpackage data and/or the like.

With continued reference to FIG. 2, Edge computer 200 may be configured to decouple network functions, wherein network functions can be deployed on edge devices such as routers, gateways dedicated server and/or the like. In one or more embodiments, various network functions may be immediately processed by edge computer rather than by a central processor. In one or more embodiments, edge computer 200 may be responsible for monitoring local traffic, responsible for routing transmissions, responsible for encoding and decoding transmission and/or the like. In one or more embodiments, edge computer may serve as an intermediary between a network or network device and a central processor or operating system. In one or more embodiments, data may be encoded or decoded prior to receipt by the operating system. In one or more embodiments, edge computer may be configured to receive communications from a network, such as transmission data and modify the transmission prior to receipt by one or more operating environments. In one or more embodiments, edge computer may be used as a network controller configured to manage or observe one or more networks. In one or more embodiments, edge computer may facilitate the transmission of communications between network devices and operating environments. In one or more embodiments, edge computer 200 may be configured to identify available networks, route data and/or the like for one or more operating environments. In one or more embodiments, edge computer may facilitate network slicing wherein edge computer may create multiple virtual networks in a single physical network. In one or more embodiments, use of edge computer 200 in networking may allow for reduced latency wherein transmissions are processed immediately and not once they are received by the operating system.

With continued reference to FIG. 2, edge computer may expand network capabilities wherein edge computer may serve as a bridge between one or more operating environments and one or more communication networks. In one or more embodiments, edge computer may be configured to allow for communication between operating environments and communication networks by converting data protocols and/or ensuring that data is properly modified between disparate networks. In one or more embodiments, edge computer may identify available communication networks and facilitate a communication between the operating environments and the available communication networks. In one or more embodiments, edge computer may serve as a virtual network interface wherein an operating environment may communicate with the virtual network in order to route transmission through a communication network.

With continued reference to FIG. 2, in one or more embodiments, edge computer 200 may be configured to handle or process a plurality of data protocols. In one or more embodiments, edge computer may identify header information within a transmission, identify a data protocol and decode the transmission accordingly.

With continued reference to FIG. 2, edge computer 200 may serve as an interface between two disparate devices. For example, and without limitation, edge computer 200 may facilitate communication between a sensor and a device seeking data from the sensor. In one or more embodiments, edge computer may be programmed for specific tasks such as but not limited to machine learning, sensor processing signal processing and/or the like. In one or more embodiments, hardware apparatus (as described in reference to FIG. 1) may include edge computer 200. In one or more embodiments, edge computer may serve as an interface between modular network interface and other components of hardware apparatus. In one or more embodiments, edge computer 200 may serve as the interface between CPU and other devices such as sensors and/or the like.

With continued reference to FIG. 2, Edge computer may include a CPU 204 and a plurality of processor cores 208 associated with the CPU. In one or more embodiments, CPU 204 may include an Intel® Atom® X6425RE Series processor, 4-core, 1.9 GHZ, 1.5 MB cache. In one or more embodiments, CPU may include any processing unit. In one or more embodiments, edge computer may include a memory 212. In one or more embodiments, memory 212 may include DDR4 or DDR5 memory. In one or more embodiments, edge computer may include a flash memory 216. In one or more embodiments, flash memory 216 may include eMMC 5.1.

With continued reference to FIG. 2, edge computer may include a network interface 228. In one or more embodiments, network interface 228 may include 10/100/1000/2.5 Gbit Ethernet (downlink to Switch). In one or more embodiments, network interface 228 may allow for edge computer 200 to connect to one or more communication networks. In one or more embodiments, edge computer 200 may include a data interface port 232. In one or more embodiments, data interface port 232 may allow for the transmission of power or data between edge computer 200 and other devices. In one or more embodiments, data interface port 232 may include USB 2.0 ports, USB3.0 ports. USB-C ports and/or any other data transfer ports.

With continued reference to FIG. 2, edge computer 200 may include a general-purpose graphics processing unit (GPGPU). In one or more embodiments, edge computer 200 may include a GPGPU system on a module (Som). In one or more embodiments, a GPGPU SOM 236 may include a hardware module that includes all the necessary components to allow for graphical processing on edge computer. In one or more embodiments, GPGPU SOM 236 may include a graphics processing unit, a memory, a processor, storage, power management and/or the like. In one or more embodiment, GPGPU SOM 236 may allow for parallel processing of various tasks. In one or more embodiments, GPGPU SOM 236 may allow for parallel processing of tasks such as data analysis, video streaming image recognition, sensor data processing and/or the like. IN one or more embodiment GPGPU SOM 236 may allow for reduced latency wherein data may be immediately analyzed at the source of generation.

With continued reference to FIG. 2, edge computer may include a network switch 240. In one or more embodiments, network switch 240 may include an L2 or L3 Switch. In one or more embodiments, edge computer 200 may include a plurality of input/output (I/O) ports 244. In one or more embodiments, I/O ports may include but are not limited to, GPS antenna ports, 5V 1PPS inputs, 5V 1PPS outputs, 10 MHZ sine wave outputs and/or the like.

At a high level, aspects of the present disclosure are directed to an apparatus for heterogenous processing. Apparatus may include a GPU, a CPU, a dedicated memory for the CPU, an FPGA, which may have a dedicated memory, a control and data bus assembly, a VPX, and one or more HSIO connections. In embodiments, apparatus may be connected to computing systems and/or local networks thereof to add processing power, support for secure operation of third-party applications, connections to peripherals, and the like. Apparatus may serve as a module in a modular computing system suitable for deployment in aircraft, land vehicles, command centers, and/or communication nodes in the field.

Figure 3:
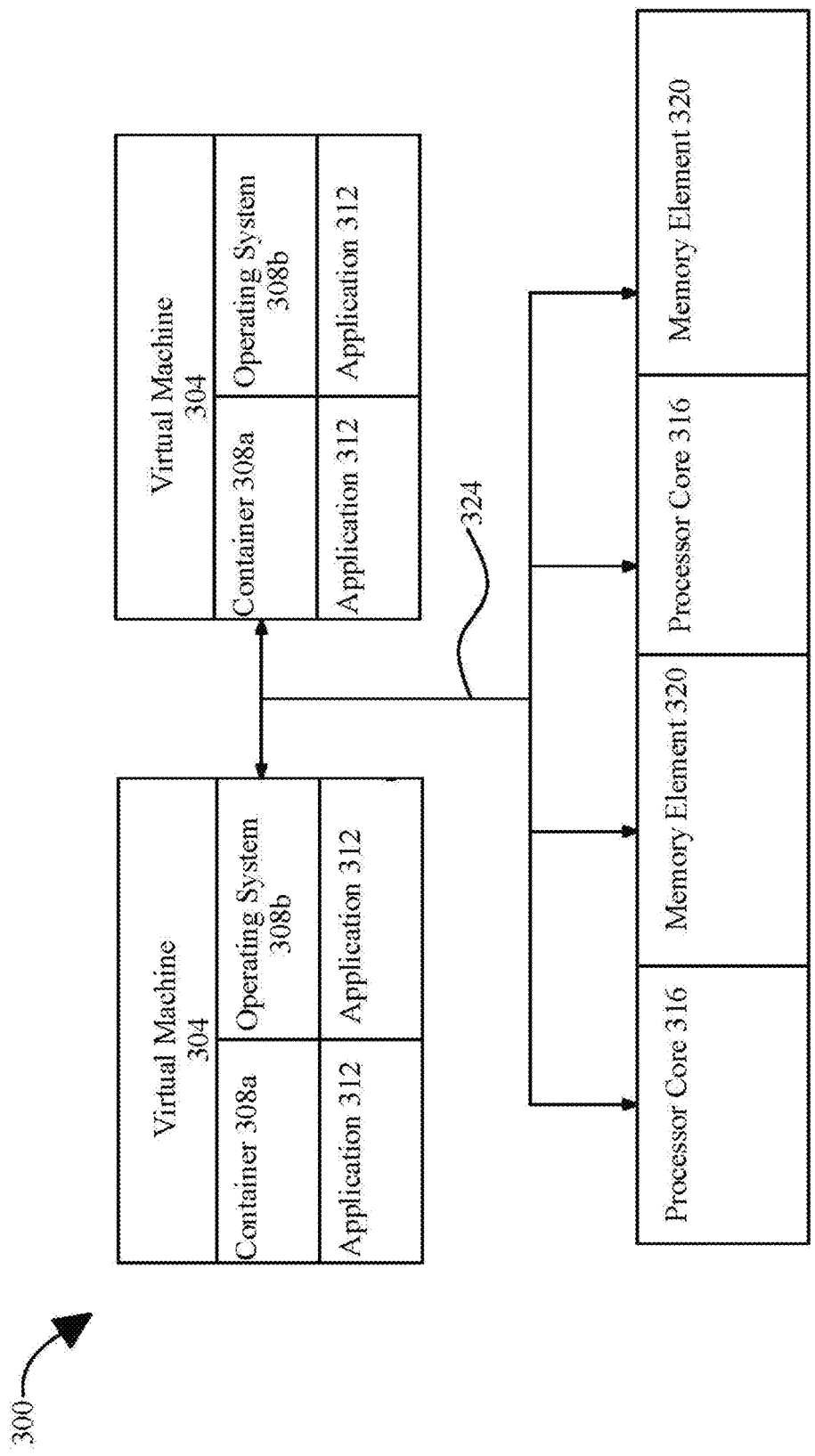
FIG. 3 is a block diagram illustrating an exemplary embodiment of a virtual environment.

Referring now to FIG. 3, an exemplary embodiment of a virtual environment 300 is illustrated. Virtual environment includes one or more virtual machines 304, which may be implemented in any manner described above and/or in disclosures incorporated herein by reference. Each virtual machine 304 may run a container 308a and/or operating system 308b, executing applications 312, which may include without limitation third-party applications, in the virtual machine 304. Virtual machines 304 and/or components therein may interface with one another, with other virtual environments, virtual machines, applications, operating systems, or the like, and/or with physical components such as processor cores 316 and/or memory elements 320 such as dedicated memory units and/or partitions, via a virtual bus 324. As used in this disclosure, a "virtual bus" is a software construct that mimics the functionality of a physical bus. In an embodiment, (I/O) virtual bus 324 may include a virtualization of I/O physical bus that facilitates communication between different components within virtual environment or even different virtual environments. In a non-limiting example, virtual bus 324 may connect first partition with second partition. In some cases, a management VM (i.e., first partition) may send one or more administrative commands to software module (i.e., second partition). Additionally, virtual bus 324 may also connect first partition with plurality of third partitions, allowing management VM to communicate with other ancillary or service-oriented partitions as described above. Virtual bus 324 may be set up in such a way that second partition is isolated from direct communication with plurality of third partitions; this means that any communication to or from second software module must go through first partition. In this case, software application running on second partition may not be able to directly access or be accessed by one or more services or functions running on plurality of third partitions. In a non-limiting example, plurality of third partitions may include various utility services e.g., logging, diagnostics, communication, backup services, wherein the virtual bus 324 may ensure second partition e.g., flight navigation system can only communicate with a controller-management VM, and not directly with other utility services which may be less secure. Virtual bus may connect, without limitation, to an exterior virtual environment.

Figure 4:
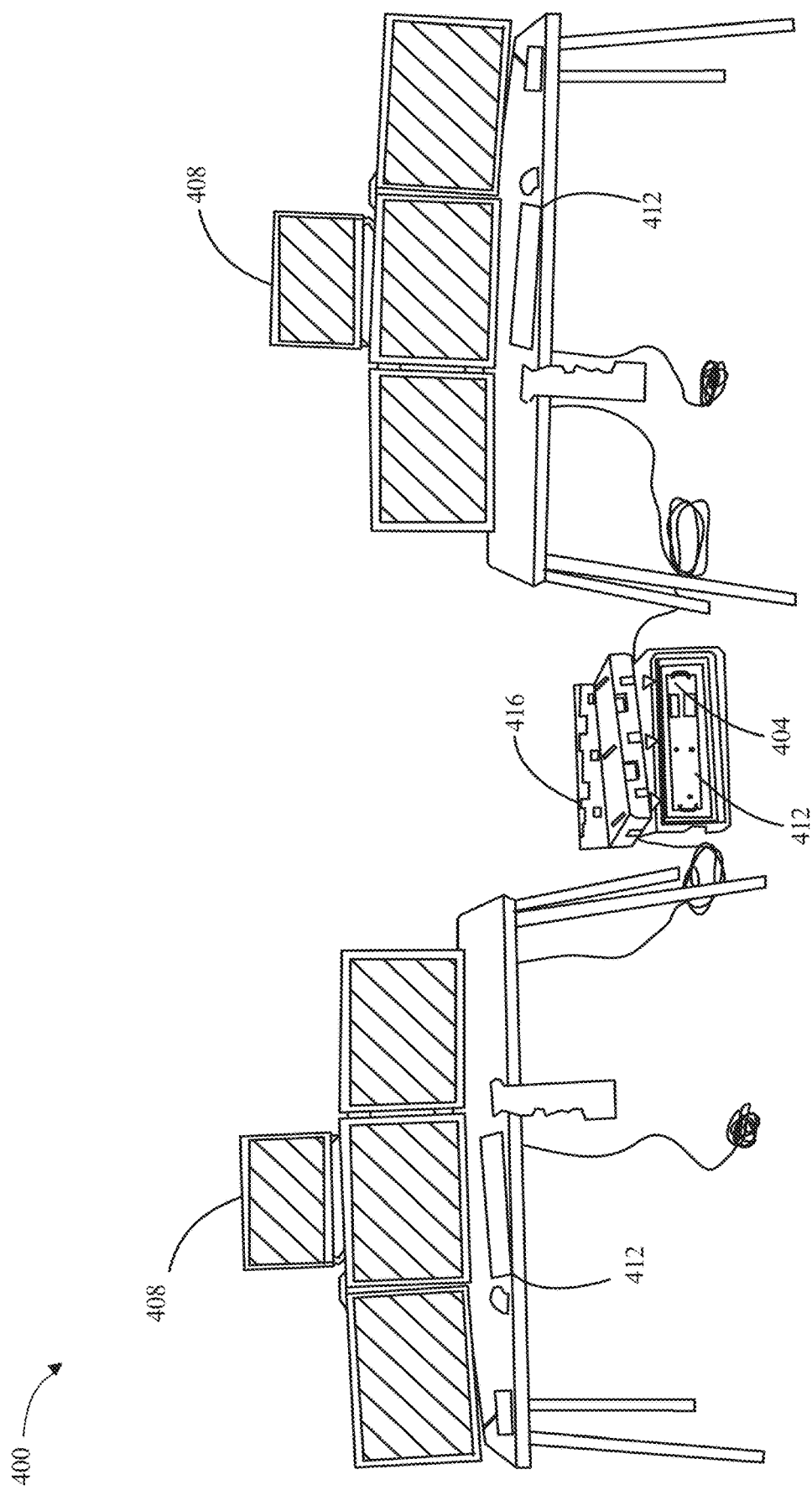
FIG. 4 is an illustration of an exemplary deployment kit including a ground control station.

Referring now to FIG. 4, an exemplary deployment kit 400 including a ground control station as described above 404 is described. In one or more embodiments, ground control station 404 may be communicatively connected to displays 408. In one or more embodiments, each display 408 may be configured to visualize a differing operating environment, differing UAV and/or the like. In one or more embodiments, ground control station 404 may include allocated hardware wherein each display may show differing information received from differing virtual environments. In one or more embodiments, ground control station may include portable ground control station as described in reference to at least FIG. 1. In one or more embodiments, input devices 412 may be communicatively connected to ground control station. In one or more embodiments, input devices 412 may include joysticks, a mouse, a keyboard, an acceleration pedal, a push to talk (PTT) pedal or the like. In one or more embodiments, input device 412 may be used to generate and/or transmit flight commands to a UAV. In one or more embodiments, input devices 412 may be used by an individual to generate flight commands within a software module and transmit the flight commands to a UAV. In one or more embodiments, ground control station 404 may be contained within a rigid container 416. In one or more embodiments, rigid container 416 may be waterproof, dust proof and/or the like. In one or more embodiments, rigid container 416 may ensure that hardware components within ground control station 404 are not damaged. Ground control terminal 404 may include one or more logic circuits as described above, including without limitation signal processing circuits such as FIR or IIR filters, FFT circuits, dedicated circuits for matrix calculations, and the like. Ground control terminal may include a low-energy accelerator (LEA) unit, which may include a coprocessor to perform one or more of the above logic circuit functions. Ground control terminal 404 may include an uninterruptable power supply (UPS); in some embodiments, each LEA may have a corresponding UPS, which may for instance be configured to provide at least 15 minutes of up-time in power outage scenarios. Ground control terminal 404 may function as a universal ground data terminal (UGDT), a universal ground control station (UGCS) and/or a universal ground data terminal (USGDT). Ground control station 404 may include a kill switch for controlled drones. Ground control kit may include one or more additional workstations, which may be deployed as laptops and/or other portable computing device. Each additional workstation may include a server class workstation with graphics exploitation. Each additional workstation may include any or all of the functionality described above for a ground control station, including functioning as a standalone command and control (C2) station for one or more UAVs or other automated vehicles and/or equipment. Each additional work station may include flight critical software, which may be deployed using hardware allocations, partitions, virtual environments, containers, or the like as described above. Additional workstations may have independent and/or backup power supplies such as battery backup; in a non-limiting example, each independent and/or backup power supply may provide at least 3.5 hours of battery backup. Each additional workstation may include removeable hard drives for faster sanitization and declassification. Kit may include one or more spare hard drives which may be swapped with hard drives of additional workstations and/or other computing devices of ground control station.

Still referring to FIG. 4, ground control station and/or multiple instances thereof may be communicatively connected to a mission support kit (not shown), which may be implemented, without limitation, in any manner disclosed in U.S. patent application Ser. No. 18/969,593, filed on Dec. 5, 2024, and entitled "HARDWARE APPARATUS FOR NETWORK COMMUNICATIONS" the entirety of which is incorporated herein by reference. Ground control terminal and/or systems described in this disclosure may implement, work with, or improve scalable control interface (SCI) systems and protocols, for instance and without limitation by implementing and/or interacting with cloud computing environments, networked computing, proxy and/or VPN routing, or the like. Ground control terminal and/or systems integrated therein or communicatively connected thereto may perform redundant positioning and navigation using inertial measurement units (IMU), chip scale clocks, or other dead reckoning or other navigational means.

In some embodiments, and still referring to FIG. 4, ground control terminal and/or other devices and/or systems described herein may operate as and/or be connected to a communications hub, which may perform software-defined networking and/or software-defined intelligent networking, for instance and without limitation as described in U.S. patent application Ser. No. 18/967,861, filed on Dec. 4, 2024, and entitled "APPARATUS AND METHOD FOR DISCOVERING AND LINKING SOFTWARE-DEFINED NETWORKING (SDN) NODES IN A COMMUNICATION NETWORK IN OPERATING ENVIRONMENTS" the entirety of which is incorporated herein by reference or in U.S. patent application Ser. No. 18/968,041, filed on Dec. 4, 2024, and entitled "APPARATUS AND METHOD FOR DISCOVERING AND LINKING SOFTWARE-DEFINED NETWORKING (SDN) NODE AND NON-SDI NODE IN A COMMUNICATION NETWORK" the entirety of which is incorporated herein by reference. Systems and/or device described herein may perform downlink and/or relay for manned or unmanned intelligence, surveillance, and reconnaissance (ISR). Systems and/or devices described herein may integrate with and/or communicatively connect to aerial and/or terrestrial networks; this may enable real-time discovery across battlespaces.

Downlink and Relay for Manned and Unmanned ISR

Figure 5C:
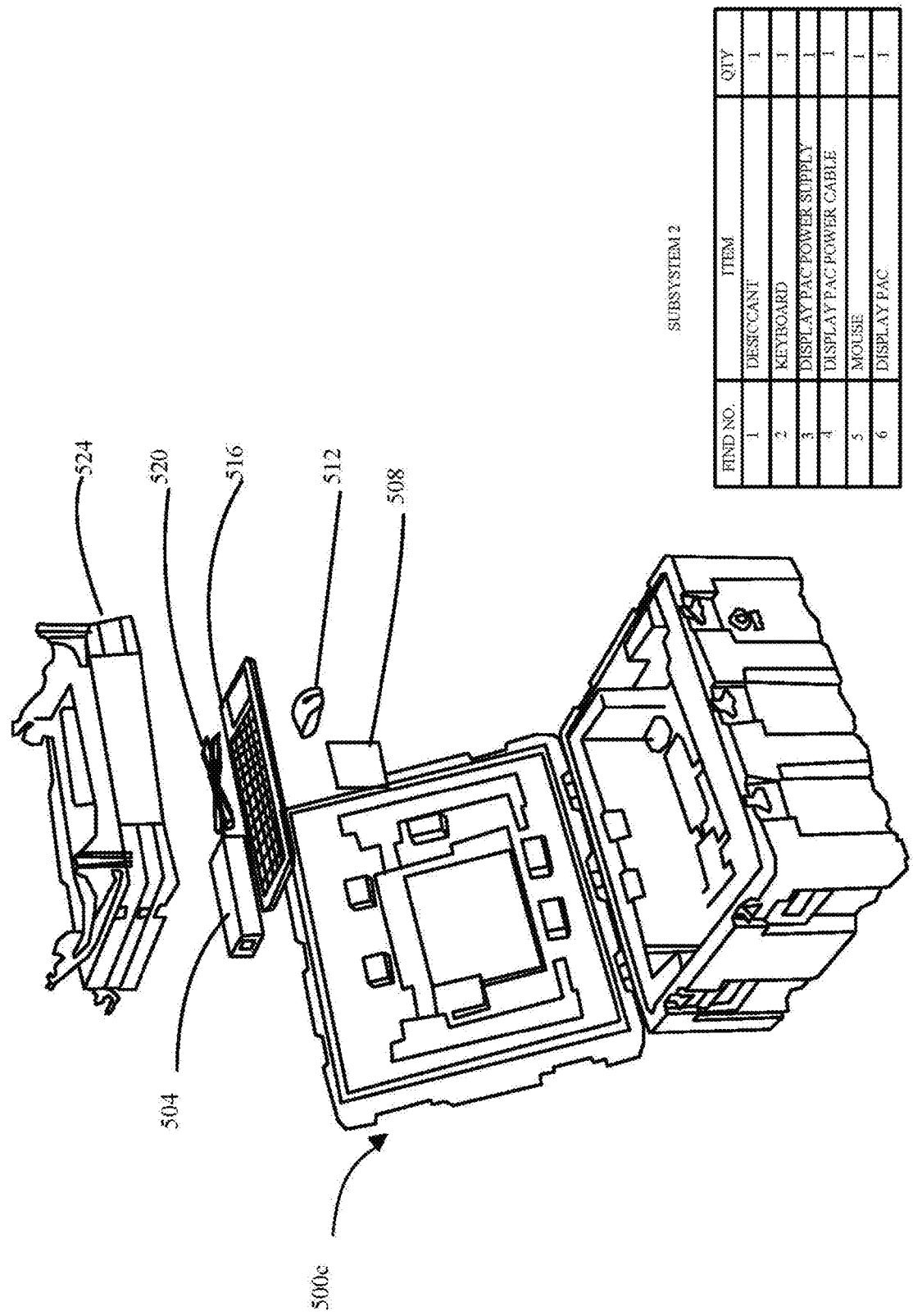
FIG. 5C is an illustration of an exemplary embodiment of a display kit with carrying case and peripherals.

Referring now to FIG. 5A, an exemplary embodiment of a display kit 500 is illustrated. Display kit 500 may include a stand 504 supporting a first display 508. A second display 512 and/or third display 516 may be mechanically connected to first display 508 and/or stand via one or more hinges 520a-b. First display 508, second display 512, and/or third display 516 may be connected to each other and/or to ground control station via one or more data connections; each display may be able to display independently of each other display. A ground control kit may include one or more additional displays which may be mounted above or otherwise associated with deployed display kit 500. Display kit 500 may be foldable and/or stowable. For instance, as shown in FIG. 5B, display kit may be foldable into a stowable form for packing in a protective case as described above. FIG. 5C illustrates an exemplary embodiment of a collapsed display 500 with collapsed stand, and a storage assembly in exploded form including a storage kit and other accessories.

Figure 6:
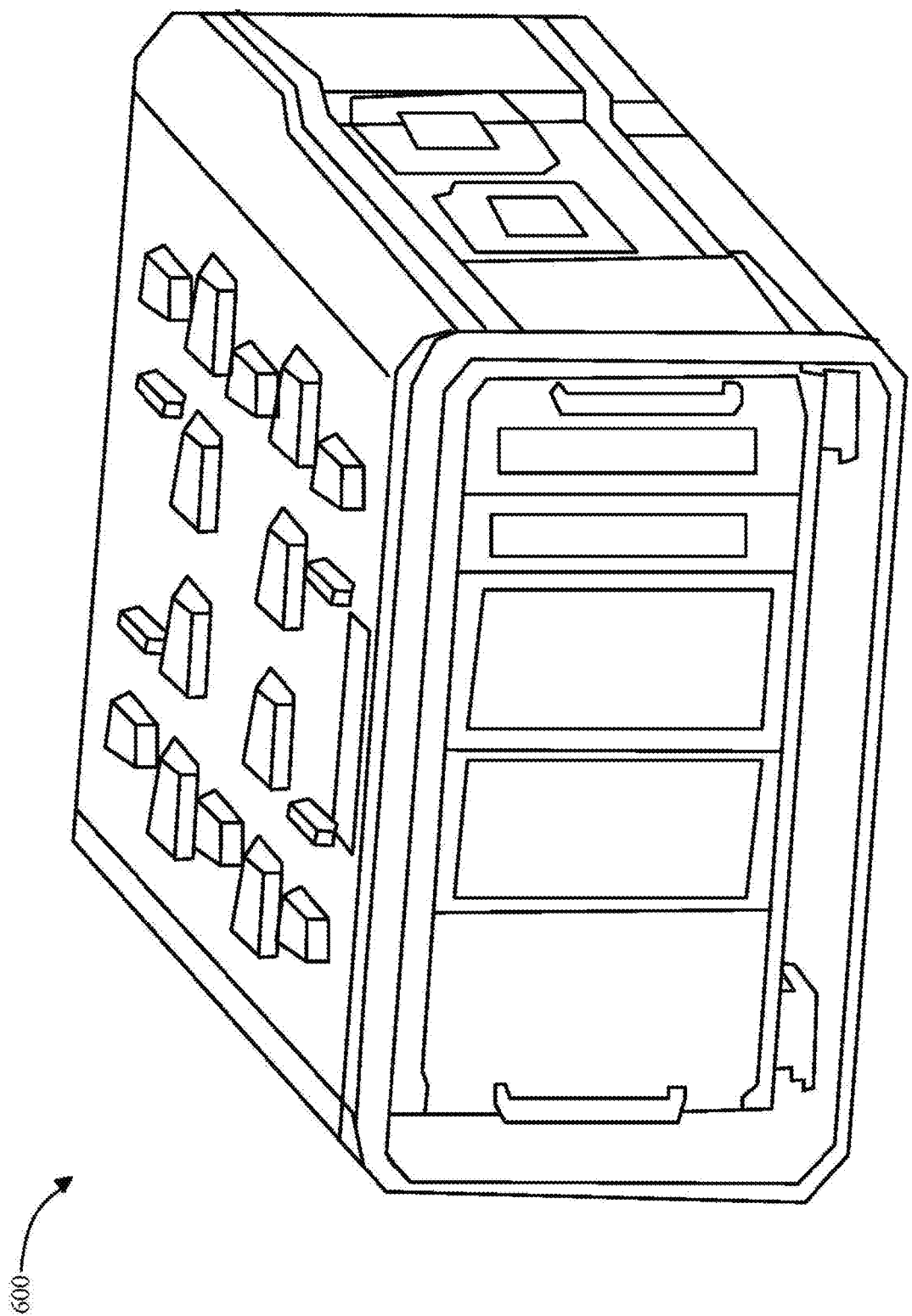
FIG. 6 is an illustration of an exemplary embodiment of a radio technical operation center (TOC) kit

Referring now to FIG. 6, an exemplary embodiment of a radio technical operation center (TOC) kit 600 that may be a part of and/or connected to ground control station as described above; TOC kit may be connected to and/or furnish part of one or more RF control channels, channels for receiving transmissions, or the like as described above. TOC kit may include, be connected to, and/or be dependent on radios provided by third parties such as producers of UAVs and/or kits for operation thereof, a government or division of government such as a military, a branch of the military, or the like; alternatively or additionally, radios developed according to ANSI standard UASCS-V3 may be used and/or reused. Radios may be communicatively connected to TOC kit and/or to ground control station via TOC kit. TOC kit may include a PCR-167. TOC kit may include a network switch, such as without limitation a PACStar switch. TOC kit may include a network router such as without limitation a PACStar Router. TOC kit may include and/or execute networking software such as without limitation Wave Relay software for ATC communications.

Figure 7:
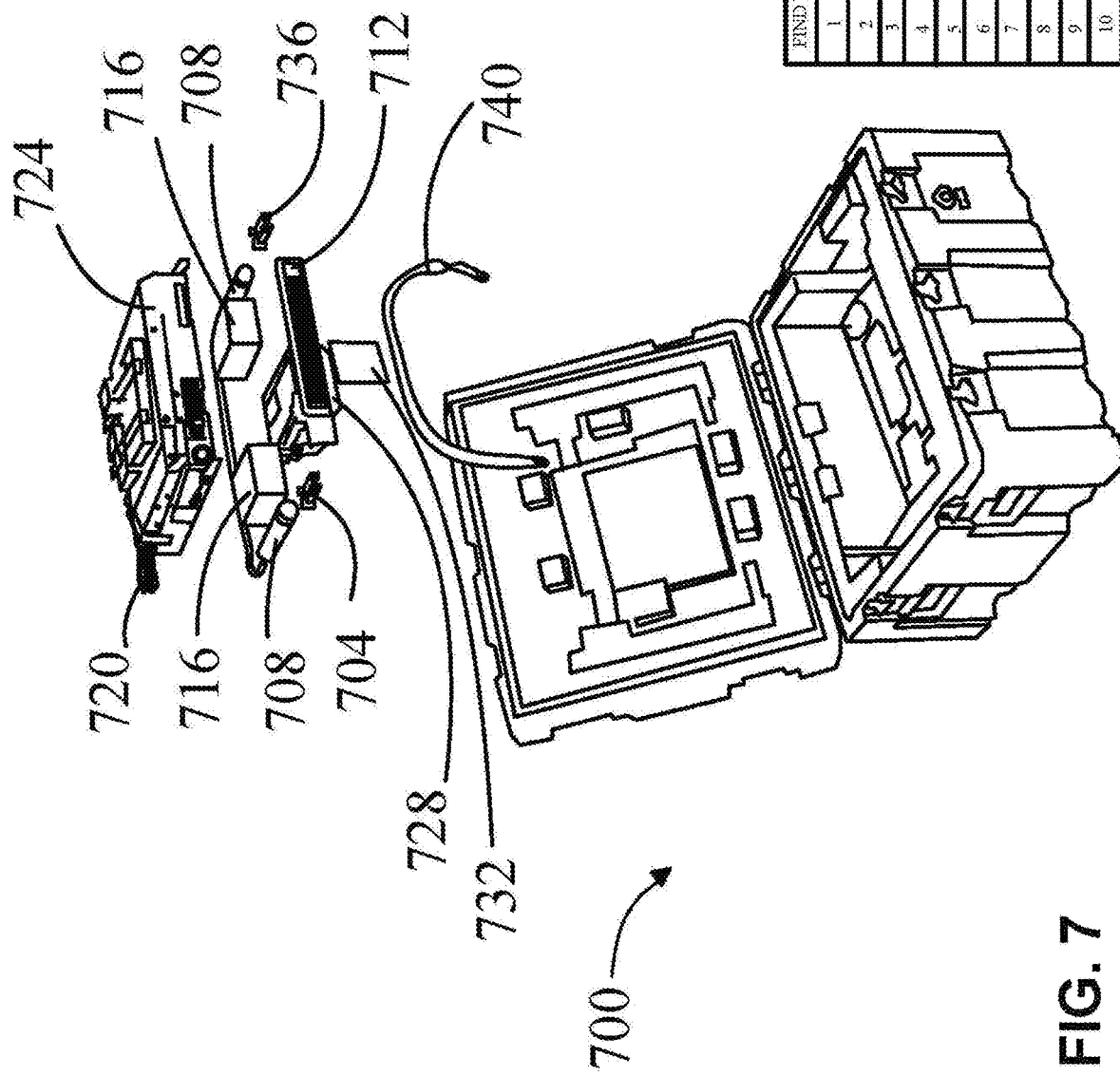
FIG. 7 is an illustration of an exemplary embodiment of a storage and transport kit for one or more computing devices and/or accessories thereof.

Referring now to FIG. 7, an exemplary embodiment of a storage and transport kit for one or more computing devices and/or accessories thereof as described above is illustrated; one or more computing devices may include without limitation ground control station and/or one or more computing devices included therein, supplemental computing devices, or the like.

Figure 8:
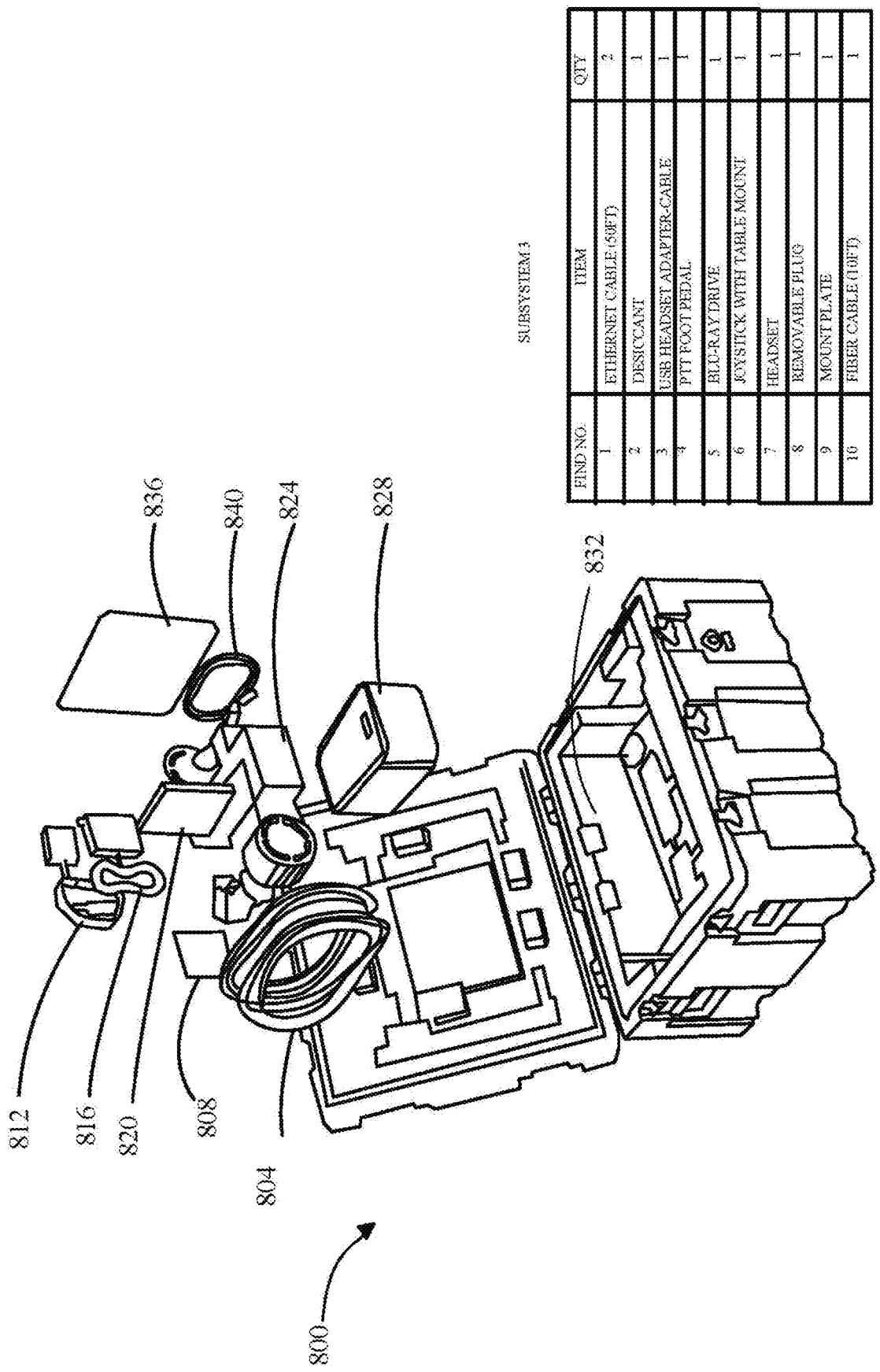
FIG. 8 is an illustration of an exemplary embodiment of a storage and transport kit for one or more computing devices and/or accessories thereof.

Referring now to FIG. 8, an exemplary embodiment of a storage and transport kit for one or more computing devices and/or accessories thereof as described above is illustrated; one or more computing devices may include without limitation ground control station and/or one or more computing devices included therein, supplemental computing devices, or the like.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A portable ground control station, the portable ground control station comprising:
   a graphical processing unit, the graphical processing unit comprising a first plurality of cores;
   a general-purpose processor, the general-purpose processor comprising a second plurality of processor cores;
   a radiofrequency (RF) control channel device comprising a plurality of radiofrequency (RF) control channels, wherein each radio frequency control channel is configured to control an unmanned aerial vehicle (UAV);
   one or more display interface outputs communicatively connected to a plurality of displays;
   a binary unit system (BUS) connecting the graphical processing unit to the general-purpose processor;
   a first memory partition communicatively connected to at least a first core of the first plurality of cores and the second plurality of cores, the first memory partition containing instructions configuring the at least a first core to:
      generate a first operating environment on the at least a first core;
      select an RF control channel of the plurality of RF control channels;
      transmit, using a software module operating in the first operating environment, at least a flight command to the UAV using the selected RF control channel;
      receive transmission data from the UAV; and
      output the transmission data on a display of the plurality of displays.

2. The portable ground control station of claim 1, wherein the general-purpose processor further comprises a reduced instruction set computer.

3. The portable ground control station of claim 1, the portable ground control station further comprising a second memory partition communicatively connected to at least a second core of the first plurality of cores and the second plurality of cores, the second memory partition containing instructions configuring the at least a second core to generate a second operating environment on the at least a second core.

4. The portable ground control station of claim 3, wherein the one or more display interface outputs comprise:

a first display interface output configured to transmit a first datum associated with the first operating environment; and a second display interface output configured to transmit a second datum associated with the second operating environment.

5. The portable ground control station of claim 1, wherein receiving the transmission data from the UAV comprises converting the transmission data from a first data protocol to a second data protocol.

6. The portable ground control station of claim 5, wherein the at least a first core is further configured to communicate the transmission data to a terrestrial device.

7. The ground control station of claim 1, wherein the RF control channel device comprises a first RF channel of the plurality of RF control channels communicatively connected to a first control transmitter and a second RF channel of the plurality of RF control channels communicatively connected to a second control transmitter.

8. The ground control station of claim 7, wherein the first control transmitter uses a first data protocol, and the second control transmitter uses a second data protocol that differs from the first data protocol.

9. The ground control station of claim 7, wherein the first control transmitter transmits to a first UAV and the second control transmitter transmits to a second UAV.

10. The portable ground control station of claim 1, wherein the first memory partition comprises a boot partition.

11. The portable ground control station of claim 1, wherein:
the portable ground control station further comprising a modular network interface, the modular network interface comprising a first network device configured to communicate with an aerial device and a second network device configured to communicate with a terrestrial device; and
the at least a first core is further configured to communicate the transmission data with a terrestrial device.

12. The portable ground control station of claim 1, wherein receiving the transmission data from the UAV comprises:
receiving a modulated carrier signal from the UAV; and
converting the modulated carrier signal into the transmission data.

13. The portable ground control station of claim 1, further comprising a field-programmable gate array (FPGA) communicatively connected to the BUS.

14. The portable ground control station of claim 13, further comprising a second memory partition, wherein the FPGA is configured to divide the BUS into a first BUS communicatively connected to the first memory partition and a second BUS communicatively connected to the second memory partition.

15. The portable ground control station of claim 13, wherein the FPGA is configured to modulate the at least a flight command into a radio frequency signal.

16. A portable ground control station, the portable ground control station comprising:
a graphical processing unit, the graphical processing unit comprising a first plurality of processor cores;
a general-purpose processor, the general-purpose processor comprising a second plurality of processor cores;
a plurality of radiofrequency (RF) control channels, wherein each channel is configured to control an unmanned aerial vehicle (UAV);
one or more display interface outputs communicatively connected to a plurality of displays;
a binary unit system (BUS) connecting the graphical processing unit to the general-purpose processor; and
a first memory partition communicatively connected to at least a first core of the first plurality of cores and the second plurality of cores, the first memory partition containing instructions configuring the at least a first core to:
generate a first operating environment on the at least a core;
select an RF control channel of the plurality of RF control channels;
receive transmission data from a UAV;
convert the transmission data from a first data protocol to a second data protocol and;
communicate the transmission data to a terrestrial device.

17. The portable ground control station of claim 16, wherein the portable ground control station serves as a participating node between the UAV and the terrestrial device.

18. The portable ground control station of claim 16, further comprising a field-programmable gate array (FPGA) communicatively connected to the BUS.

19. The portable ground control station of claim 18, further comprising a second memory partition, wherein the FPGA is configured to divide the BUS into a first BUS communicatively connected to the first memory partition and a second BUS communicatively connected to the second memory partition.

20. The portable ground control station of claim 19, wherein the one or more display interface outputs comprises:
a first display interface output configured to transmit a first datum associated with the first operating environment; and
a second display interface output configured to transmit a second datum associated with the second operating environment.

* * * * *